US010169748B2

(12) United States Patent
Balasubramanian et al.

(10) Patent No.: US 10,169,748 B2
(45) Date of Patent: *Jan. 1, 2019

(54) ALTERNATIVE PAYMENT IMPLEMENTATION FOR ELECTRONIC RETAILERS

(71) Applicant: CARDINALCOMMERCE CORPORATION, Mentor, OH (US)

(72) Inventors: Chandra S. Balasubramanian, University Hts., OH (US); Michael A. Keresman, III, Kirtland Hills, OH (US); Eric Goodman, Willoughby, OH (US); Adam Ratica, Mentor, OH (US); Scott Rauhe, Lakewood, OH (US)

(73) Assignee: CardinalCommerce Corporation, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,965

(22) Filed: Jun. 23, 2014

(65) Prior Publication Data

US 2015/0012371 A1 Jan. 8, 2015

Related U.S. Application Data

(63) Continuation of application No. 13/832,395, filed on Mar. 15, 2013, now Pat. No. 8,762,210, which is a (Continued)

(51) Int. Cl.
G06Q 20/22 (2012.01)
G06Q 20/20 (2012.01)
(Continued)

(52) U.S. Cl.
CPC ........... G06Q 20/20 (2013.01); G06Q 20/027 (2013.01); G06Q 20/108 (2013.01); G06Q 20/12 (2013.01);
(Continued)

(58) Field of Classification Search
CPC ............................ G06Q 20/22; G06Q 20/227
See application file for complete search history.

(56) References Cited

U.S. PATENT DOCUMENTS 3,806,874 A 4/1974 Ehrat
4,720,860 A 1/1988 Weiss
(Continued)

FOREIGN PATENT DOCUMENTS

EP 0 668 579 A2 8/1995
EP 1 107198 B1 6/2001
(Continued)

OTHER PUBLICATIONS

Bürk, et al., "Value Exchange Systems Enabling Security and Unobservability," Elsevier Science Publishers, vol. 9, No. 8, Dec. 1990, pp. 715-721.

(Continued)

Primary Examiner — Talia F Crawley
(74) Attorney, Agent, or Firm — The Webb Law Firm

(57) ABSTRACT

A system and method process a transaction between a merchant and a consumer at a point of sale (POS). Transaction information for the transaction is received from the consumer at the POS. The transaction information identifies an alternative payment option of an alternative payment provider to use for the transaction. A universal merchant platform (UMP) is requested to approve the transaction with the alternative payment provider of the identified alternative payment option. The request includes the received transaction information and is provided to the UMP according to a unified payment implementation. In response to approval of the transaction, an order identifier is received from the UMP. The order identifier uniquely identifies the transaction. The UMP is requested to authorize and/or capture funds for the transaction using a payment implementation specific to the (Continued)

alternative payment provider of the identified alternative payment option.

24 Claims, 7 Drawing Sheets

Related U.S. Application Data continuation-in-part of application No. 12/477,483, filed on Jun. 3, 2009.

(60) Provisional application No. 61/058,449, filed on Jun. 3, 2008.

(51) Int. Cl.
  *G06Q 40/00* (2012.01)
  *G06Q 20/10* (2012.01)
  *G06Q 20/12* (2012.01)
  *G06Q 20/32* (2012.01)
  *G06Q 20/40* (2012.01)
  *G06Q 30/06* (2012.01)
  *G06Q 20/02* (2012.01)
  *G06Q 30/04* (2012.01)

(52) U.S. Cl.
  CPC .......... *G06Q 20/22* (2013.01); *G06Q 20/227* (2013.01); *G06Q 20/32* (2013.01); *G06Q 20/3223* (2013.01); *G06Q 20/40* (2013.01); *G06Q 30/04* (2013.01); *G06Q 30/06* (2013.01); *G06Q 40/12* (2013.12)

(56) References Cited

U.S. PATENT DOCUMENTS

| | | | |
|---|---|---|---|
| 4,747,050 | A | 5/1988 | Brachtl et al. |
| 4,799,156 | A | 1/1989 | Shavit et al. |
| 4,800,590 | A | 1/1989 | Vaughan |
| 4,885,778 | A | 12/1989 | Weiss |
| 5,168,520 | A | 12/1992 | Weiss |
| 5,233,655 | A | 8/1993 | Shapiro |
| 5,237,614 | A | 8/1993 | Weiss |
| 5,251,259 | A | 10/1993 | Mosley |
| 5,317,636 | A | 5/1994 | Vizcaino |
| 5,361,062 | A | 11/1994 | Weiss et al. |
| 5,450,491 | A | 9/1995 | McNair |
| 5,478,994 | A | 12/1995 | Rahman et al. |
| 5,479,512 | A | 12/1995 | Weiss |
| 5,485,519 | A | 1/1996 | Weiss |
| 5,490,251 | A | 2/1996 | Clark et al. |
| 5,491,752 | A | 2/1996 | Kaufman et al. |
| 5,513,272 | A | 4/1996 | Bogosian, Jr. |
| 5,544,246 | A | 8/1996 | Mandelbaum et al. |
| 5,557,518 | A | 9/1996 | Rosen |
| 5,590,038 | A | 12/1996 | Pitroda |
| 5,590,197 | A | 12/1996 | Chen et al. |
| 5,627,355 | A | 5/1997 | Rahman et al. |
| 5,657,388 | A | 8/1997 | Weiss |
| 5,671,279 | A | 9/1997 | Elgamal |
| 5,715,314 | A | 2/1998 | Payne et al. |
| 5,742,684 | A | 4/1998 | Labaton et al. |
| 5,757,917 | A | 5/1998 | Rose et al. |
| 5,761,306 | A | 6/1998 | Lewis |
| 5,781,632 | A | 7/1998 | Odom |
| 5,790,667 | A | 8/1998 | Omori et al. |
| 5,790,677 | A | 8/1998 | Fox et al. |
| 5,809,144 | A | 9/1998 | Sirbu et al. |
| 5,815,665 | A | 9/1998 | Teper et al. |
| 5,825,881 | A | 10/1998 | Colvin, Sr. |
| 5,826,245 | A | 10/1998 | Sandberg-Diment |
| 5,884,271 | A | 3/1999 | Pitroda |
| 5,884,288 | A | 3/1999 | Chang et al. |
| 5,887,065 | A | 3/1999 | Audebert |
| 5,909,492 | A | 6/1999 | Payne et al. |
| 5,913,203 | A | 6/1999 | Wong et al. |
| 5,937,068 | A | 8/1999 | Audebert |
| 5,937,394 | A | 8/1999 | Wong et al. |
| 5,956,699 | A | 9/1999 | Wong et al. |
| 5,988,497 | A | 11/1999 | Wallace |
| 5,991,411 | A | 11/1999 | Kaufman et al. |
| 5,991,413 | A | 11/1999 | Arditti et al. |
| 5,995,626 | A | 11/1999 | Nishioka et al. |
| 5,999,624 | A | 12/1999 | Hopkins |
| 5,999,626 | A | 12/1999 | Mullin et al. |
| 6,005,939 | A | 12/1999 | Fortenberry et al. |
| 6,014,650 | A | 1/2000 | Zampese |
| 6,018,724 | A | 1/2000 | Arent |
| 6,026,166 | A | 2/2000 | Lebourgeois |
| 6,029,150 | A | 2/2000 | Kravitz |
| 6,070,150 | A | 5/2000 | Remington et al. |
| 6,092,053 | A | 7/2000 | Boesch et al. |
| 6,270,011 | B1 | 8/2001 | Gottfried |
| 6,272,492 | B1 | 8/2001 | Kay |
| 6,327,578 | B1 | 12/2001 | Linehan |
| 6,366,893 | B2 | 4/2002 | Hannula et al. |
| 6,519,571 | B1 | 2/2003 | Guheen et al. |
| 6,529,886 | B1 | 3/2003 | Campana et al. |
| 6,560,581 | B1 | 5/2003 | Fox et al. |
| 6,675,153 | B1 | 1/2004 | Cook et al. |
| 7,003,480 | B2 | 2/2006 | Fox et al. |
| 7,003,789 | B1 | 2/2006 | Linehan |
| 7,051,002 | B2 | 5/2006 | Keresman, III et al. |
| 7,058,611 | B2 | 6/2006 | Kranzley et al. |
| 7,089,208 | B1 | 8/2006 | Levchin et al. |
| 7,111,789 | B2 | 9/2006 | Rajasekaran et al. |
| 7,120,609 | B1 | 10/2006 | Kerkdijk |
| 7,133,645 | B2 | 11/2006 | Thermond |
| 7,133,843 | B2 | 11/2006 | Hansmann et al. |
| 7,133,846 | B1 | 11/2006 | Ginter et al. |
| 7,191,151 | B1 | 3/2007 | Nosek |
| 7,237,117 | B2 | 6/2007 | Weiss |
| 7,249,094 | B2 | 7/2007 | Levchin et al. |
| 7,349,557 | B2 | 3/2008 | Tibor |
| 7,469,341 | B2 | 12/2008 | Edgett et al. |
| 7,499,889 | B2 | 3/2009 | Golan et al. |
| 7,546,944 | B2 | 6/2009 | Goldberg et al. |
| 7,647,252 | B2 | 1/2010 | Rampell et al. |
| 7,693,783 | B2 | 4/2010 | Balasubramanian et al. |
| 7,707,120 | B2 | 4/2010 | Dominguez et al. |
| 7,788,139 | B2 | 8/2010 | Rampell et al. |
| 7,966,259 | B1 | 6/2011 | Bui |
| 7,996,324 | B2 | 8/2011 | Bishop et al. |
| 8,140,429 | B2 | 3/2012 | Balasubramanian et al. |
| 8,271,395 | B2 | 9/2012 | Dominguez et al. |
| 8,396,810 | B1 | 3/2013 | Cook |
| 8,762,210 | B2 * | 6/2014 | Balasubramanian ........ G06Q 20/027 705/16 |
| 2001/0011256 | A1 | 8/2001 | Hannula et al. |
| 2001/0032878 | A1 | 10/2001 | TSiounis |
| 2001/0047334 | A1 | 11/2001 | Nappe et al. |
| 2002/0032616 | A1 | 3/2002 | Suzuki et al. |
| 2002/0042776 | A1 | 4/2002 | Woo et al. |
| 2002/0042781 | A1 | 4/2002 | Kranzley et al. |
| 2002/0103752 | A1 | 8/2002 | Berger et al. |
| 2002/0138287 | A1 | 9/2002 | Chen et al. |
| 2003/0009382 | A1 | 1/2003 | D'Arbeloff et al. |
| 2003/0093372 | A1 | 5/2003 | Atogi et al. |
| 2003/0130958 | A1 | 7/2003 | Narayanan et al. |
| 2003/0200172 | A1 | 10/2003 | Randle et al. |
| 2003/0233327 | A1 | 12/2003 | Keresman, III et al. |
| 2004/0002918 | A1 | 1/2004 | McCarthy et al. |
| 2004/0078328 | A1 | 4/2004 | Talbert et al. |
| 2005/0164739 | A1 | 7/2005 | Goldberg et al. |
| 2005/0177750 | A1 | 8/2005 | Gasparini et al. |
| 2005/0256802 | A1 | 11/2005 | Ammermann et al. |
| 2006/0149665 | A1 | 7/2006 | Weksler |
| 2006/0235758 | A1 | 10/2006 | Schleicher |
| 2006/0282382 | A1 | 12/2006 | Balasubramanian et al. |
| 2008/0028228 | A1 | 1/2008 | Mardikar et al. |
| 2008/0033878 | A1 | 2/2008 | Krikorian et al. |
| 2008/0103923 | A1 | 5/2008 | Rieck et al. |
| 2008/0168544 | A1 | 7/2008 | von Krogh |

(56) References Cited

U.S. PATENT DOCUMENTS

| | | | |
|---|---|---|---|
| 2008/0172341 | A1 | 7/2008 | Crandell |
| 2009/0313147 | A1 | 12/2009 | Balasubramanian et al. |
| 2010/0153200 | A1 | 6/2010 | Thomas |
| 2010/0169215 | A1 | 7/2010 | Balasubramanian et al. |
| 2011/0047054 | A1 | 2/2011 | Ginter et al. |
| 2011/0167002 | A1 | 7/2011 | Balasubramanian et al. |
| 2011/0258090 | A1 | 10/2011 | Bosch et al. |
| 2012/0016728 | A1 | 1/2012 | Ahmad et al. |
| 2012/0116933 | A1 | 5/2012 | Matthews et al. |
| 2012/0197760 | A1 | 8/2012 | Balasubramanian et al. |
| 2013/0211934 | A1 | 8/2013 | Balasubramanian |
| 2014/0081863 | A1 | 3/2014 | Balasubramanian |
| 2014/0089194 | A1 | 3/2014 | Balasubramanian |
| 2014/0108250 | A1 | 4/2014 | Balasubramanian |
| 2014/0156532 | A1 | 6/2014 | Balasubramanian |

FOREIGN PATENT DOCUMENTS

| | | | |
|---|---|---|---|
| EP | 1 134 707 | A1 | 9/2001 |
| GB | 2360380 | | 9/2001 |
| JP | 60 079466 | | 5/1985 |
| WO | WO 93/04425 | | 3/1993 |
| WO | WO 99/07121 | | 2/1999 |
| WO | WO 00/01108 | A | 1/2000 |
| WO | WO 01/18719 | A1 | 3/2001 |
| WO | WO 01/18720 | A1 | 3/2001 |
| WO | WO 01/26062 | A1 | 4/2001 |
| WO | WO 01/46918 | A2 | 6/2001 |
| WO | WO 01/78493 | A3 | 10/2001 |
| WO | WO 01/80100 | A1 | 10/2001 |
| WO | WO 01/82246 | A | 11/2001 |
| WO | WO 02/25604 | | 3/2002 |
| WO | WO 02/44976 | A2 | 6/2002 |
| WO | WO 03/107242 | A1 | 12/2003 |

OTHER PUBLICATIONS

David Chaum, "Security Without Identification: Transaction Systems to Make Big Brother Obsolete," Communications of the ACM, vol. 28, No. 10, Oct. 1985, pp. 1030-1044.
David Chaum, "Achieving Electronic Privacy," Scientific American, vol. 267, No. 2, Aug. 1992, pp. 76-81.
Exhibit AW2 to the statutory declaration of Andrew Weller Jan. 15, 2009—Joint press release issued by Visa and other technology providers (Jun. 27, 2001).
Exhibit BB4 to the statutory declaration of Bahram Boutorabi Jan. 27, 2009—*An Introduction to Authentication* (GPayment white paper—2000-2002).
Exhibit BB5 to the statutory declaration of Bahram Boutorabi Jan. 27, 2009—*Authentication* (GPayment white paper—2000-2002).
Exhibit BB6 to the statutory declaration of Bahram Boutorabi Jan. 27, 2009—*Smart Payment Technology* (GPayment white paper—2000-2002).
Exhibit BB7 to the statutory declaration of Bahram Boutorabi Jan. 27, 2009—*Electronic Wallets: Past, Present and Future* (GPayment white paper—2000-2002).
Exhibit BB8 to the statutory declaration of Bahram Boutorabi Jan. 27, 2009—*Pseudo Card Numbers* (GPayment white paper—2000-2002).
Exhibit BB9 to the statutory declaration of Bahram Boutorabi Jan. 27, 2009—Cached version of www.gpayments.com (May 11, 2002).
Exhibit BB10 to the statutory declaration of Bahram Boutorabi Jan. 27, 2009—Presentation entitled ActiveAccess Overview (Nov. 22, 2001).
Exhibit BB11 to the statutory declaration of Bahram Boutorabi Jan. 27, 2009—GPayments paper outlining authentication products (May 29, 2002).
Exhibit BB13 to the statutory declaration of Bahram Boutorabi Apr. 7, 2009—*3-D Secure Vendor Forum* (Visa presentation—Nov. 2, 2000).
Exhibit BB14 to the statutory declaration of Bahram Boutorabi Apr. 7, 2009—*3-D Secure Payment Authorisation* (Visa presentation—Jan. 25, 2001).
Exhibit BB15 to the statutory declaration of Bahram Boutorabi Apr. 7, 2009—*3-D Secure Vendor Forum* (Visa presentation—Jan. 25, 2001).
Exhibit BB16 to the statutory declaration of Bahram Boutorabi Apr. 7, 2009—*3-D Secure Interoperability Center* (Visa presentation—Jan. 25, 2001).
Exhibit BB17 to the statutory declaration of Bahram Boutorabi Apr. 7, 2009—Wikipedia Plug-In article (as at Apr. 7, 2009).
Exhibit BB18 to the statutory declaration of Bahram Boutorabi Apr. 7, 2009—*ActivePayment* (GPayment presentation—Feb. 7, 2000).
Exhibit BB19 to the statutory declaration of Bahram Boutorabi Apr. 7, 2009—*Eliminating Payment Fraud* (GPayment presentation—Apr. 16, 2002).
Exhibit BB20 to the statutory declaration of Bahram Boutorabi Apr. 7, 2009—*Authentication and Payment in Asia Pacific* (GPayment presentation—May 2, 2002).
Exhibit BB21 to the statutory declaration of Bahram Boutorabi Apr. 7, 2009—*VeriSign Conference Call and Online Demonstration* (GPayments presentation—May 21, 2002).
Exhibit BB22 to the statutory declaration of Bahram Boutorabi Apr. 7, 2009—Cached version of www.cyota.com (Feb. 13, 2002).
Exhibit BB23 to the statutory declaration of Bahram Boutorabi Apr. 7, 2009—PC-EFTPOS website (as at Apr. 7, 2009).
Exhibit BB24 to the statutory declaration of Bahram Boutorabi Apr. 7, 2009—OCV Implementation Suggestions (Oct. 22, 1999).
Exhibit BB25 to the statutory declaration of Bahram Boutorabi Mar. 5, 2010—GPayments ActiveAccess Overview (Apr. 16, 2002).
Exhibit BB26 to the statutory declaration of Bahram Boutorabi Mar. 5, 2010—Screen captures from Visa-certified version of GPayments (May 23, 2002).
Exhibit BB27 to the statutory declaration of Bahram Boutorabi Mar. 5, 2010—Schedule of certification of ActiveMerchant and ActiveAccess (Jun. 12, 2002).
Exhibit BB28 to the statutory declaration of Bahram Boutorabi Mar. 5, 2010—Presentation given at Sun Microsystems (May 2002).
Hamann et al. "Securing E-Business Applications Using Smart Cards," IBM Systems Journal, 2001. vol. 40, No. 3, pp. 635-647. [Accessed May 29, 2013—ProQuest] http://search.proquest.com/docview/222422057.
Karpinski. "IBM Payment Software to Run Atop App Server," InternetWeek, Nov. 1999. No. 790, p. 9. [Accessed May 29, 2013—ProQuest] http://search.proquest.com/docview/226906024.
Kutler et al. "MasterCard, IBM Team Up for E-Wallet Distribution," American Banker, Sep. 15, 1999. vol. 164, No. 177. [Accessed May 29, 2013—ProQuest] http://search.proquest.com/docview/249853957.
Malhotra. "Wireless Group Makes Strides, Still Faces Obstacles," American Banker, Jun. 7, 2002. vol. 167, No. 109. [Accessed May 29, 2013—ProQuest] http://search.proquest.com/docview/249855144.
Stallings. "The SET Standard & E-Commerce," Dr. Dobb's Journal, Nov. 2000. vol. 25, No. 11, pp. 30-36. [Accessed May 29, 2013—ProQuest] http://search.proquest.com/docview/202722072.
"Payments Could Be a Gold Mine Standards Remain Overriding Issue, BITS Attempts to Unite Industry," Retail Delivery System News, Feb. 13, 1998. vol. 3, No. 3, p. 1. [Accessed May 29, 2013—ProQuest] http://search.proquest.com/docview/206583755.
Petition to Institute a Covered Business Method Patent Review under Section 18 of the Leahy-Smith America Invents Act and 37 C.F.R. Section 42.300 et seq. regarding U.S. Pat. No. 7,051,002 for Universal Merchant Platform for Payment Authentication, filed with the United States Patent and Trademark Office on Nov. 15, 2013.
Petition to Institute a Covered Business Method Patent Review under Section 18 of the Leahy-Smith America Invents Act and 37 C.F.R. Section 42.300 et seq. regarding U.S. Pat. No. 7,693,783 for Universal Merchant Platform for Payment Authentication, filed with the United States Patent and Trademark Office on Nov. 16, 2013.
Petition to Institute a Covered Business Method Patent Review under Section 18 of the Leahy-Smith America Invents Act and 37 C.F.R. Section 42.300 et seq. regarding U.S. Pat. No. 8,140,429 for

(56) References Cited

OTHER PUBLICATIONS

Universal Merchant Platform for Payment Authentication, filed with the United States Patent and Trademark Office on Nov. 15, 2013.
Declaration of Jason Napsky in Support of Petitions for Covered Business Method Patent Review regarding U.S. Pat. No. 7,051,002, U.S. Pat. No. 7,693,783 and U.S. Pat. No. 8,140,429 for Universal Merchant Platform for Payment Authentication, executed on Nov. 13, 2013.
Declaration of Greg Wooten in Support of Petitions for Covered Business Method Patent Review regarding U.S. Pat. No. 7,051,002, U.S. Pat. No. 7,693,783 and U.S. Pat. No. 8,140,429 for Universal Merchant Platform for Payment Authentication, executed on Nov. 14, 2013.
Declaration of Sandeep Chatterjee, Ph.D. in Support of Petitions for Covered Business Method Patent Review regarding U.S. Pat. No. 7,051,002, U.S. Pat. No. 7,693,783 and U.S. Pat. No. 8,140,429 for Universal Merchant Platform for Payment Authentication.
Exhibit 1010 in Support of Petitions for Covered Business Method Patent Review regarding U.S. Pat. No. 7,051,002, U.S. Pat. No. 7,693,783 and U.S. Appl. No. 8,140,429 for Universal Merchant Platform for Payment Authentication, SOAP Version 1.2, W3C Working Draft Jul. 9, 2001, http://www.w3.org/TR/2001/WD-soap12-20010709/.
IBM & Microsoft Corp., "Web Services Framework", Apr. 11, 2001.
"/n Software's MPI Software", 2002 (no document available).
Abad-Peiro et al., "Designing a Generic Payment System", Nov. 26, 1996.
Bartolini et al., "Requirements for Automated Negotiation", Apr. 11, 2001.
Best, "WSWS Position Paper", Apr. 11, 2001.
Bettag, "Position Paper for W3C Workshop on Web Services", Apr. 11, 2001.
Bosworth, "Developing Web Services", Apr. 11, 2001.
Brown, "VeriSign Web Services Positioning Paper"., Apr. 11, 2001.
Brown, "Reliable Messaging", Apr. 11, 2001.
Camarena, "WebMethods Position on Web Services", Apr. 11, 2001.
Cutler, "Chevron Interest in Web Services Workshop", Apr. 11, 2001.
Daniels, "Web Services Position Paper", Apr. 11, 2001.
Derose, "Position Paper for the W3C WSDL Workshop", Apr. 11, 2001.
Dornfest, "Position Paper for W3C Workshop on Web Services", Apr. 11, 2001.
Douglas, "Infrastructure Requirements for Business-Class Web Services", Apr. 11, 2001.
Edgar, "W3C Web Services: A Position Paper for the W3C", Apr. 11, 2001.
Eisenberg, "W3C Web Services Workshop Position Paper: Preparing for the Web Services Paradigm", Apr. 11, 2001.
Evans, "Transaction Internet Protocol: Facilitating Distributed Internet Applications", Apr. 11, 2001.
Ferguson, "Web Services Architecture: Direction and Position Paper", Apr. 11, 2001.
Frolund, et al., "Transactional Conversations", Apr. 11, 2001.
Fuchs, "Commerce One Position Paper—Workshop on Web Services", Apr. 11, 2001.
Gartner, "W3C Web Services Workshop—Position Paper", Apr. 11, 2001.
Govindarajan et al., "Conversation Definitions: Defining Interfaces of Web Services" Apr. 11, 2001.
Govindarajan, et al., "Web Services Architecture Overview Paper", Apr. 11, 2001.
Guardalben, "W3C Web Services Workshop Position Paper", Apr. 11, 2001.
Gudgin, et al., "SOAP Version 1.2 Specification", Jul. 9, 2001.
Hale, "Content Management for Web Services", Apr. 11, 2001.
Hall, et al., "Web Services Workshop Intel Position", Apr. 11, 2001.
Ingham et al., "Position Paper on Web Transactions", Apr. 11, 2001.
Isaacson, "Web Services Workshop Position Paper", Apr. 11, 2001.
Iwasa, "Fujitsu Position Paper for Workshop on Web services", Apr. 11, 2001.
Jerbic, "Hewlett Packard Position Paper to the Worldwide Web Consortium Workshop on Web Services", Apr. 11, 2001.
Karakashian, "BEA Position Paper on the W3C Web Services Workshop", Apr. 11, 2001.
Karp, et al., "Advertising and Discovering Business Services", Apr. 11, 2001.
Ketchpel, et al., "U-PAI: A Universal Payment Application Interface", 1996.
Laskey, "Position Paper Regarding Web Services", Apr. 11, 2001.
Machiraju, "A Peer-to-Peer Service Interface for Manageability", Apr. 11, 2001.
Manes, "Enabling Open, Interoperable, and Smart Web Services: The Need for Shared Context", Apr. 11, 2001.
Mitra, "Ericsson contribution to the W3C Workshop on Web Services", Apr. 11, 2001.
Moberg, "Web Services, Synchronous Collaborations, and Solutions to Distributed Process Coordination Problems Reflecting Legacy Integration Latencies", Apr. 11, 2001.
Morciniec, et al., "Towards the Electronic Contract", Apr. 11, 2001.
Moreau et al., "Using XML for Describing Web Services", Apr. 11, 2001.
Mullins, "Web Services Workshop Position Paper", Apr. 11, 2001.
Newcomer, et al., "Web Services Definition Position Paper", Apr. 11, 2001.
Nielsen, "SOAP Addressing and Path Modeling", Apr. 11, 2001.
Nottingham, "Web Service Scalability and Performance with Optimising Intermediaries", Apr. 11, 2001.
Ogbuji, "Position Paper for W3C Workshop on Web Services", Apr. 11, 2001.
Orchard, "Jamcracker W3C Web Services Workshop Position Paper", Apr. 11, 2001.
Prud'Hommeaux, Eric, "Semantic Web Position Paper", Apr. 11, 2001.
Reagle, Jr., XML Security:, Apr. 11, 2001.
Reed, "Requirements for a Global Identity Management Service", Apr. 11, 2001.
Sabbouh, et al., "Interoperability: Workshop on Web Services", Apr. 11, 2001.
Sankar, WebServices Framework & Assertion Exchange using SAML Apr. 11, 2001.
Scott, "The Road to Web Services", Apr. 11, 2001.
Seaborne et al., "A Framework for Business Composition", Apr. 11, 2001.
Sedukhin, "Platform for Assembly, Orchestration, and Management of Web Services", Apr. 11, 2001.
Service Real Authentication Data Storage, Aug. 14, 2002.
Sormunen, "Position Paper to W3C Forum WorkShop Web Services", Apr. 11, 2001.
Srivastava, "Oracle Dynamic Services: Oracle's Web Services Framework", Apr. 11, 2001.
Tauber, "Protocol for Accessing RDF-Based Registries", Apr. 11, 2001.
Tenenbaum et al., "Eco System: An Internet Commerce Architecture", May 1997.
Thatte, "Message Exchange Protocols for Web Services", Apr. 11, 2001.
Thompson, "Web Services—Beyond HTTP Tunneling", Apr. 11, 2001.
Verified by Visa (VbV) Protocol, (NS 000580-680), 2001.
Virdhagriswaran, et al., "Two Level Architecture for Web Service Interactions", Apr. 11, 2001.
Whitmer, "Web Services for Clients", Apr. 11, 2001.
Wiechers, "SAP Position Paper", Apr. 11, 2001.
Winer, "UserLand's Position on Web Services", Apr. 11, 2001.
Zilles et al., "Position paper", Apr. 11, 2001.
Gpayments: Visa 3-D Secure vs. MasterCard SPA, Mar. 1, 2002, pp. 1-37.

* cited by examiner

ALTERNATIVE PAYMENT IMPLEMENTATION FOR ELECTRONIC RETAILERS

This application is a Continuation of application Ser. No. 13/832,395, Filed Mar. 15, 2013, which is a Continuation-in-Part of application Ser. No. 12/477,483, filed Jun. 3, 2009, which claims the benefit of U.S. Provisional Application No. 61/058,449, filed Jun. 3, 2008, incorporated herein by reference in its entirety.

TECHNICAL FIELD

The present disclosure generally relates to methods and/or systems for processing electronic payments. In particular, the disclosure is directed to methods and/or systems that provide authentication support and/or other payment processing solutions for electronic retailers (eTailers) conducting business over a telecommunications network, e.g., the Internet and wireless networks. However, it is to be appreciated that the presently disclosed subject matter is equally amenable to other like applications and/or environments.

INCORPORATION BY REFERENCE

U.S. Pat. No. 7,051,002, the disclosures of which are incorporated herein by reference, is mentioned.

BACKGROUND

By way of background, Internet commerce, or e-commerce as it is otherwise known, relates to the buying and selling of products and services between consumers and merchants over the Internet or other like transactional exchanges of information. The convenience of shopping over the Internet has sparked considerable interest in e-commerce on behalf of both consumers and merchants. Internet sales, or like transactions, have been typically carried out using standard credit cards such as Visa, MasterCard, Discover, American Express, or the like, or standard debit cards, i.e., check cards or automated teller machine (ATM) cards which directly access funds from an associated deposit account or other bank account.

While widely used for more traditional face-to-face transactions, use of these standard cards in connection with e-commerce presents certain difficulties, including difficulties concerning authentication or positive identification of the cardholder. These difficulties are evident in view of increasing reports of fraud and identity theft and have led to a deterioration of consumer confidence in the security of their personal information. The resulting apprehension has been further fueled by consumer uncertainty as to the reputation and integrity of a merchant with whom the consumer is dealing. Naturally, this poses a problem for merchants because the willingness of consumers to purchase goods or services electronically is inversely proportional to the apprehension they may have about the safety of their personal information.

In lieu of these difficulties, many merchants have turned to alternative payment providers, such as Paypal and Google, which offer the prospect of greater security for both merchants and consumers. Alternative payment providers further remove the merchants and the consumers from potential fraud and allow any fraudulently obtained funds to be more readily recovered. In essence, alternative payment providers provide another layer of protection against fraud. Consequently, it should come as no surprise that alternative payment providers have the perception of being more secure for online purchases than credit cards and debit cards.

However, each alternative payment provider has its own alternative payment implementation, with its own processing flow, message formats, response codes and communication protocols. While alternative payment providers often ensure participating merchants that fraudulent transactions and other charge backs, as they are known in the art, will not be the merchants' responsibility, this assurance is conditioned on the merchants properly implementing the alternative payment implementation. And, to the extent alternative payment implementations change, merchants are responsible for updating their system. Furthermore, typical integration with an alternative payment provider uses resources, i.e., computing power, memory, data storage capacity, etc., merchants would otherwise prefer to devote to other tasks. Often, the plug-in component can be extremely large and/or cumbersome to implement on a merchant's server. Thus, as should be apparent, there are considerable burdens placed upon merchants to properly implement the unique alternative payment implementations of each alternative payment provider. And, insofar as a merchant wishes to use several alternative payment options offered by a plurality of alternative payment providers, these burdens increase that much more.

Beyond Internet commerce, merchants often transact with consumers face-to-face at points of sale. Such face-to-face transactions typically relate to the buying and selling of goods and/or services between consumers and merchants or other like transactional exchanges of information. In processing face-to-face transactions, payment options are typically limited to standard credit cards or standard debit cards; consumers are not given the option to use alternative payment options. While alternative payment options offer greater security for both consumers and merchants, as well as greater flexibility than standard payment options, implementing standard payment options at the point of sale can be burdensome and challenging. As noted above, each alternative payment option has its own alternative payment implementation. Further, alternative payment implementations are typically designed for Internet commerce.

The present invention contemplates a new and improved system and/or method to overcome the above-referenced difficulties and others.

BRIEF DESCRIPTION

In accordance with one aspect of the present invention, a system processes a transaction between a merchant and a consumer at a point of sale (POS). The system includes at least one processor programmed to receive transaction information for the transaction from the consumer at the POS. The transaction information identifies an alternative payment option of an alternative payment provider to use for the transaction. A universal merchant platform (UMP) is requested to approve the transaction with the alternative payment provider of the identified alternative payment option. The UMP provides a unified payment implementation for transacting with a plurality of alternative payment providers, including the alternative payment provider. The request includes the received transaction information and is provided to the UMP according to the unified payment implementation. In response to approval of the transaction, an order identifier is received from the UMP. The order identifier uniquely identifies the transaction. The UMP is requested to authorize and/or capture funds for the transaction using a payment implementation specific to the alternative payment provider of the identified alternative payment option. The request identifies the transaction with the received order identifier and provided to the UMP according to the unified payment implementation.

In accordance with one aspect of the present invention, a method processes a transaction between a merchant and a consumer at a point of sale (POS). The method includes receiving by at least one processor transaction information for the transaction from the consumer at the POS. The transaction information identifies an alternative payment option of an alternative payment provider to use for the transaction. A universal merchant platform (UMP) is requested by the at least one processor to approve the transaction with the alternative payment provider of the identified alternative payment option. The UMP provides a unified payment implementation for transacting with a plurality of alternative payment providers, including the alternative payment provider. The request includes the received transaction information and is provided to the UMP according to the unified payment implementation. In response to approval of the transaction, an order identifier is received by the at least one processor from the UMP. The order identifier uniquely identifies the transaction. The UMP is requested by the at least one processor to authorize and/or capture funds for the transaction using a payment implementation specific to the alternative payment provider of the identified alternative payment option. The request identifies the transaction with the received order identifier and provided to the UMP according to the unified payment implementation.

In accordance with yet another aspect of the present invention, a system processes a transaction between a merchant and a consumer at a point of sale (POS). The system includes a point of sale consumer device including a display device and a point of sale control system including at least one processor. The at least one processor is programmed to receive first transaction information for the transaction from the consumer at the POS. The first transaction information includes order information and/or customer information and identifies an alternative payment option of an alternative payment provider to use for the transaction. Further, the first transaction information is received using a first user interface displayed to a representative of the merchant on a display device of the point of sale system. A second user interface is configured to collect second transaction from the consumer at the POS. The second transaction information includes transaction information required to carry out the transaction using the identified alternative payment option. The second user interface is configured specifically for the identified alternative payment option. The second transaction information is received from the consumer using the second user interface, where the second transaction information is displayed on the display device of the point of the sale consumer device. A universal merchant platform (UMP) is requested to approve the transaction with the alternative payment provider of the identified alternative payment option. The UMP provides a unified payment implementation for transacting with a plurality of alternative payment providers, including the alternative payment provider. The request includes the first transaction information and/or the second transaction information, and is provided to the UMP according to the unified payment implementation. In response to approval of the transaction, an order identifier is received from the UMP. The order identifier uniquely identifies the transaction. The UMP is requested to authorize and/or capture funds for the transaction using a payment implementation specific to the alternative payment provider of the identified alternative payment option.

Numerous advantages and benefits of the present invention will become apparent to those of ordinary skill in the art upon reading and understanding the present specification.

BRIEF DESCRIPTION OF THE DRAWINGS

The presently disclosed subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

For clarity and simplicity, the present specification shall refer to structural and/or functional network elements, entities and/or facilities, relevant standards, protocols and/or services, and other components that are commonly known in the art without further detailed explanation as to their configuration or operation except to the extent the same has been modified or altered in accordance with and/or to accommodate aspects of the present invention.

An alternative payment provider provides an alternative payment option. Alternative payment providers include, but are not limited to, Google, PayPal, Bill Me Later, MyeCheck, Secure Vault Payments, and other alternative providers. Alternative payment options include, but are not limited to, Google Checkout and PayPal Express, which, as should be apparent, are provided by Google and PayPal, respectively. Additionally, it is also contemplated that an alternative payment provider may provide more than one alternative payment option. For example, the alternative payment provider Bill Me Later provides the following alternative payment options: Bill Me Later Express and Bill Me Later Business.

Each alternative payment provider has its own unique alternative payment implementation, which includes, but is not limited to, a processing flow, response codes, communications protocols, message formats. PayPal, for example, uses a processing flow that requires a transaction to be initiated by the merchant, whereby the merchant obtains a transaction ID. Using this transaction ID, the merchant then redirects the consumer to PayPal, where the consumer verifies the order. Upon verifying the order, the consumer is redirected to the merchant's website so the merchant can complete the transaction and provide the consumer with a receipt.

Figure 1:
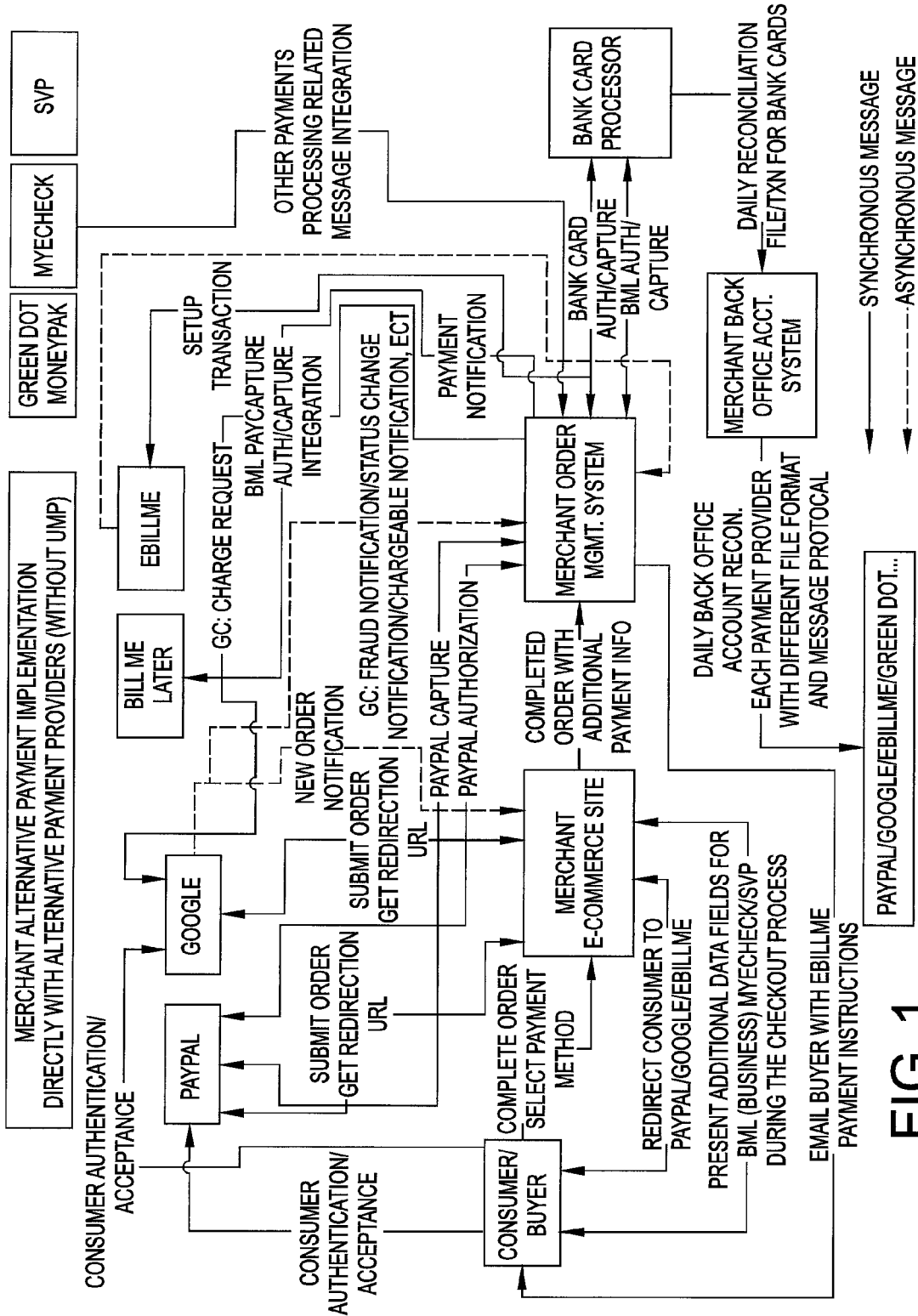
FIG. 1 is a diagrammatic illustration showing a prior art e-commerce system that a merchant may employ to support one or more alternative payments via direct communication and/or interfacing with the alternative payment provider, e.g., such as PayPal, Google, etc.

In this regard, FIG. 1 is a diagrammatic illustration showing a prior art e-commerce system that a merchant may employ to support one or more alternative payments via direct communication and/or interfacing with the alternative payment provider, e.g., such as PayPal, Google, etc.

With reference now to FIG. 1 it is noted that the illustrated flow presents an example of all the message integration that is employed for a merchant integrating with one or more alternative payment brands. For the sake of simplicity, the flow provides only details related to PayPal, GoogleCheckout, BillMeLater and eBillMe. Typically, every alternative payment has the following components: consumer acknowledgement (authentication), reserving funds and moving funds from the buyer to the seller. Generally, each alternative payment provider provides their own message format and communication/message exchange protocol.

As discussed above, payment implementations are very burdensome for a merchant to implement. This is even more so when a merchant wishes to implement multiple alternative payment implementations. In accordance with the preferred embodiment, the present invention serves as a centralized merchant processing system for alternative payment options (herein referred to as the universal merchant platform (UMP)). The UMP processes transactions from one or more merchants, where each transaction processed by the UMP uses one of a plurality of alternative payment options supported by the UMP.

The UMP advantageously allows a merchant to securely and easily process consumer transactions using any one of a plurality of alternative payment options by offloading the processing of the transaction to the UMP. In this manner, only the maintainer of the UMP needs to worry about implementing and maintaining the various alternative payment implementations. The UMP further enables merchants to handle these transactions regardless of which alternative payment implementation is being used by using a common payment implementation. Namely, the merchant need only implement the payment implementation called for by the UMP.

Figure 2:
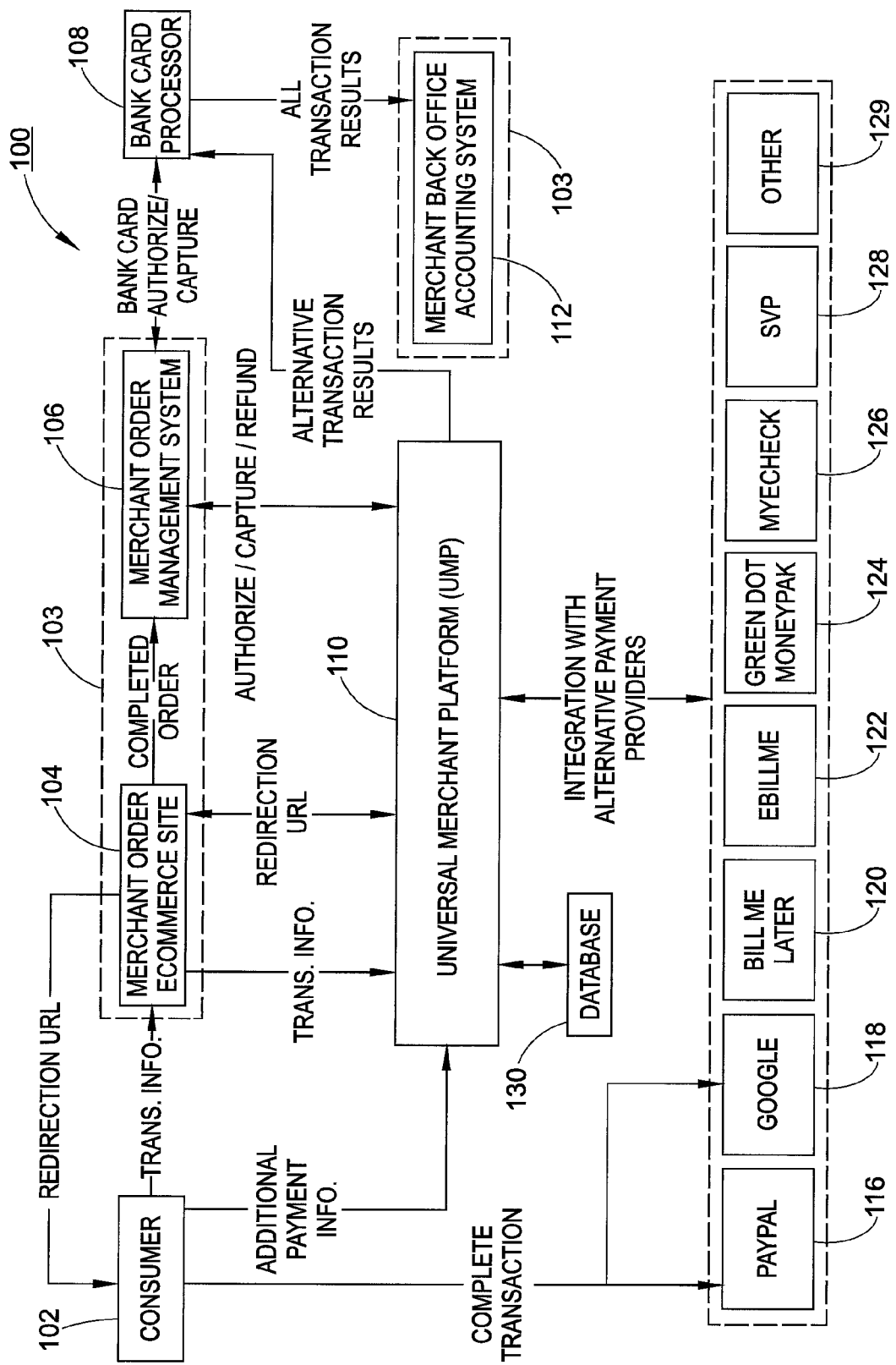
FIG. 2 is a diagrammatic illustration showing an exemplary e-commerce system that a merchant may employ to support one or more alternative payment options via a universal merchant platform.

With reference to FIG. 2, a diagrammatic illustration of an exemplary e-commerce system 100 that a merchant 103 may employ to support one or more alternative payment options 114 via a UMP 110 is shown. The system 100 includes, but is not limited to, a consumer 102, the merchant 103, a bank card processor 108, the UMP 110, a merchant back office accounting system 112, a database 130, and alternative payment providers 114. The consumer 102 will generally be the average web user browsing the internet on their home computer with a standard web browser, e.g., Firefox. The consumer 102 may also be using a mobile telephone or personal digital assistant (PDA) with internet and/or short message service (SMS) capabilities. However, the consumer 102 may also take other forms, such as, but not limited to, governments and companies acting through their employees. The merchant 103 generally refers to the average electronic retailer with an internet website operative to allow the consumer 102 to purchase goods and/or services electronically, e.g., Amazon or CDW. The merchant 103 includes, but is not limited to, a merchant website 104 and a merchant order management system 106. The merchant website 104 is the frontend which the consumer 102 interacts with while performing a transaction with the merchant 103. The order management system 106 processes the orders for the merchant 103 that the consumer 102 submits on the merchant website 104. The merchant 103 may optionally include a merchant back office accounting system 112, which, as its name would suggest, is responsible for verifying internal records kept by the merchant order management system 106 match the transaction results from the UMP and any other payment providers. The bank card processor 108 allows the merchant 103 to accept bank cards, such as credit cards and debit cards, as a payment option for consumers 102. Among others, National Bankcard Inc. provides such services. Additionally, or in the alternative, the bank card processor 108 is operative to process and format alternative payment transaction results from the UMP 110. The UMP 110 provides a bridge between a uniform alternative payment implementation and the individual alternative payment implementations called for by the alternative payment providers supported by the UMP 110. The database 130 provides the UMP with storage for transaction information and may be external or internal to the UMP 110. The database 130 may be a MySQL, MSSQL, Oracle, Microsoft Access, or other database. Alternative payment providers provide the alternative payment options accepted by the merchant 103 and include, but are not limited to, PayPal 116, Google 118, Bill Me Later 120, eBillMe 122, Green Dot MoneyPak 124, MyeCheck 126, SVP 128, and other alternative payment providers 129.

Additionally, FIG. 2 shows the general flow of messages between the merchant 103, the consumer 102, the UMP 110, the alternative payment providers 114, the bank card processor 108 and the merchant back office system 112. The following discussion will track the general flow of messages between these components of the system 100 and elaborate on the role of the components in the system 100.

Tracking the flow of a transaction within the system 100 of FIG. 2, the transaction beings with the consumer 102. As is commonly known, consumers 102 generally browse a merchant's site 104 and add items they wish to purchase into a shopping cart. Once a consumer 102 has finished browsing the retailer's website 104, the consumer 102 has the option to view the items within their shopping cart and checkout. If the consumer chooses to checkout, the consumer 102 is thereafter prompted to enter additional information, including, but not limited to, payment information and shipping information. Under the preferred embodiment of the present invention, the consumer 102 has the option of selecting any one of a plurality of alternative payment options which are supported by the UMP 110, such as PayPal Express. The consumer 102 may further have other payment options, such as paying with a credit card or a debit card. As shown in FIG. 2, the merchant 103 is integrated with a bank card processor 108 that provides the consumer 102 the option of paying with a debit card.

After the consumer 102 finishes entering this additional information the transaction information is sent to the merchant 103. Transaction information (e.g., HTML, SMS) collectively refers to, inter alia, the payment information, order information and shipping information. Additionally, order information general comprises the line items of the shopping cart. However, order information may alternatively refer to the shopping cart total. Upon receiving the transaction information, the merchant 103 determines the payment option selected by the consumer 102 and what action to take. If the consumer 102 selected an alternative payment option, the merchant 103 forwards the transaction information to the UMP 110 for further processing. Otherwise, the merchant 103 takes the appropriate steps to process the selected payment option locally. And, if additional information is unnecessary to process the transaction locally, the merchant 103 may prompt the consumer 102 to confirm the order, whereby the consumer 102 can complete the transaction.

Once the UMP 110 obtains the transaction information from the merchant 103, the UMP 110 may optionally check to see if the selected alternative payment option is available. This is useful because if an alternative payment provider experiences technical difficulties such that their services are unavailable, it is advantageous to fail gracefully instead of providing the consumer 102 with an error message, such as a "404 not found message." Thus, by checking the availability of an alternative payment provider 114 before the transaction proceeds further, the UMP 110 can notify the merchant 114 of the unavailability of the alternative payment provider 114, and the merchant 110 can prompt the consumer 102 to select a different payment option. Additionally, the UMP 110 can disable the alternative payment option for other merchants 103.

Assuming the selected alternative payment provider 114 is available, the UMP 110 provides the merchant 103 with a payment network routable order identifier that uniquely identifies the transaction to the merchant 103. The merchant 103 uses the order identifier throughout the lifecycle of the transaction. The transaction lifecycle includes, but is not limited to, payment authorization, payment capture, refund, and cancellation. The order identifier is preferably a Mod 10 compliant 16 digit number and may further be prefixed with specific digits to enable easier decision processing logic implementation within the merchant order management system 106. Additionally, the order identifier is preferably specific to the merchant 103, such that two different merchants 103 may have the same order identifier.

The UMP 110 further provides the merchant 103 with a redirection URL and a token. The redirection URL varies depending upon the alternative payment option selected by the consumer 102 and serves to facilitate at least one of two functions: collecting additional payment information from the consumer 102; or getting consumer authentication. Some alternative payment providers 114 use an alternative payment implementation that requires the consumer 102 to directly authenticate and enter additional information with the alternative payment provider 114. The token serves to identify the transaction.

In order to maintain a relationship between all the transaction information collected during the lifecycle of a transaction, the UMP 110 includes the database 130 to save the transaction information. As should be appreciated, database is being used loosely. A database may be a traditional database such as a database provided by MySQL, or it may simply be a data structure stored within the memory of the UMP 110. However, regardless of how the information is stored, it is of particular importance that the database 130 stores a merchant identifier, e.g., the merchant's name, the order identifier and the token for each transaction. The database 130 also stores information about the merchants registered to use the UMP 110. Among other things, this information includes a return redirection URL and a merchant identifier.

Upon receiving the redirection URL and token from the UMP 110, the merchant 103 redirects the consumer 102 with the token and the redirection URL. The token identifies the transaction to the party the consumer 102 is redirected to. Under the preferred embodiment, the merchant 103 redirects the consumer 102 with a concatenation of the redirection URL and the token, where the token is appended to the end of the redirection URL as part of a query string. The party to which the consumer 102 is redirected need only read the query string to identify the transaction. However, other methods are also contemplated for transferring the token to the party which the consumer 102 is redirected to. One such method being form posts.

If the redirection URL is used to collect additional payment information from the consumer 102, the redirection URL points to the UMP 110 and the UMP 110 generates the token. The UMP 110 prompts the consumer 102 to enter additional payment information that is specific to the alternative payment provider 114 being used. BiliMeLater (BML), for example, demands the collection of up to 40 different data elements, including, but not limited to, EIN, salary, and the number of years the BML business user has worked at the company. MyeCheck, on the other hand, demands the collection, inter alia, of the consumer's driver license no., state, ABA and account number. After entering the additional payment information, the UMP 110 validates and stores the additional payment information in the database 130.

Upon collecting this additional payment information from the consumer 102, the consumer 102 is redirected back to the merchant's website 104. The UMP 110 knows where to redirect the consumer 102 because the token allows the UMP 110 to find the record associated with the transaction in the database 130. This, in turn, allows the UMP 110 to recover the merchant identifier for the transaction. With the merchant identifier, the UMP 110 is able to lookup the registration record in the database for that particular merchant 103. As mentioned above, the merchant 103 initially registers with the UMP 110 and provides a return redirection URL which is stored in the database 130. Thus, UMP 110 is able to retrieve a return redirection URL from the database 130. Alternatively, the merchant may simply provide the UMP with a return redirection URL prior to the initial redirection, such that there is no need for storing registrations.

Naturally, because the consumer 102 left the merchant's website, it may also be necessary for the consumer 102 to provide identification to merchant 103 on return redirection. In the exemplary embodiment the consumer 102 identifies itself to the merchant's website 104 using the order identifier assigned to the transaction. As with the redirection URL and the token, the order identifier is preferably appended to the return redirection URL as part of a query string. Because the UMP 110 stored the token and order identifier in the database 130, and the UMP 110 knows what token is associated with the transaction, the UMP 110 is able to make a mapping between the token and the order identifier by simply searching the database 130 for the token. Notwithstanding the ability to use a query string to transfer the order identifier, form posts may also be used to identify the consumer 102 to the merchant 103. Alternatively, session variables may also be appropriate for identifying the consumer to the merchant, such that the consumer 102 does not even need to provide the order identifier to the merchant 103.

When the redirection URL is being used to get consumer authentication, the redirection URL generally points to the alternative payment provider associated 114 with the transaction. The UMP 110 knows where to redirect the consumer 102 because the redirect URL is part of the alternative payment implementation, which the UMP 110 implements. With reference to FIG. 2, PayPal 116 and Google 118 are examples of alternative payment providers 114 that require direct consumer authentication. Once the consumer 102 has been redirected to the alternative payment provider 114, the consumer 102 logs in and enters any additional information called for by the alternative payment provider 114. The consumer 102 may further be asked to verify the order information. Upon completing any tasks called for by the alternative payment provider 114, the consumer 102 is redirected to the merchant's website 104 and the transaction proceeds towards completion. However, unlike the process above described for collecting additional payment information, the token and return redirection URL are determined differently.

Alternative payment providers that require consumer authentication, such as PayPal 116 and Google 118, require the transaction to be initiated with the alternative payment provider 114 prior to returning a redirection URL. This encompasses the UMP 110 providing the alternative payment provider 114 with transaction information in exchange for a token; this is the token returned to the merchant 103. Additionally, the UMP 110 provides the alternative payment provider 114 with a return redirection URL. As is done when collecting additional payment information, the UMP 103 preferably retrieves the return redirection URL from the database and preferably concatenates it with a query string containing the order identifier. As mentioned, the order identifier identifies the consumer 102 to the merchant 103 upon return redirect. However, alternative means of identifying the consumer 102 to the merchant 103 may be sufficient, e.g., session variables.

Once the consumer 102 is redirected back to the merchant 103, the merchant 103 submits the completed order to the order management system 106 for processing. Among other things, the order management system 106 is provided with the order identifier. As established above, the merchant 103 receives the order identifier as part of the return redirection URL, or alternatively recovers it from other means, such as session variables or form posts. Additionally, the order management system is provided with the amount of the transaction. Because this is not present in the return redirection URL, the merchant 103 must maintain an internal database between order identifiers and transaction information. Alternatively, the merchant 103 may recover the information from the UMP 110 or session variables.

The order management system 106 instructs the UMP 110 to complete the transaction once it receives the completed order. To accomplish this, the order management system 106 sends a transaction message to the UMP 110. The transaction message generally includes the order identifier, operation type and amount. The operation type is generally one of authorize/capture and refund. As one should appreciate, authorize and capture are separate and distinct. However, because they are generally used in unison, they will be grouped for the duration of this discussion. The transaction message is further formatted with a common messaging format. This allows a merchant 103 to use a single message format for any of the alternative payment options. The UMP 110 does any needed translation between the common message format and the message format called for by the alternative payment provider 114.

Upon receiving a transaction message, the UMP 110 performs one of the following: processes the message real-time or defers processing the messages for batch processing. Batch processing advantageously allows the UMP 110 to process several transactions with an alternative payment provider 114 at the same time. Among other reasons, this is important when the UMP 110 has limited connectivity to the alternative payment provider 114. However, notwithstanding the advantages of batch processing, the determination on whether to process transaction as part of a batch process depends largely on whether the alternative payment provider 114 associated with the message supports batch processing.

If batch processing is not appropriate, the UMP 110 immediately performs the operation type requested by the merchant 110 for the given order identifier. Because the UMP 110 stored all the transaction information during the preceding steps, it has all of the required information necessary to complete the transaction. Accordingly, the UMP 110 determines which alternative payment provider 114 is associated with the provided order identifier. Upon making this determination, the UMP 110 performs the operation type specified in the transaction message according to the specific implementation required by the alternative payment provider 114 associated with the determined alternative payment option.

The UMP 110 takes all the required information and formats it according to the specific message formats called for by the alternative payment provider 114. Moreover, the UMP 110 translates the operation type into the corresponding messages used by the alternative payment provider 114. Thereafter, the UMP 110 completes the transaction using the communication protocols required by the alternative payment provider 114. This encompasses handling both synchronous and asynchronous messages, as necessary. In the case of asynchronous messages, the UMP 110 queues the messages for synchronous processing. Google Checkout, for example, generates approximately 10 asynchronous notifications during a typical transaction. Moreover, the UMP 110 may also need to handle transaction chaining. Namely, some alternative payment providers 114, such as PayPal 116, require communications to include identifiers obtained from preceding communications. Thus, in short, the UMP 110 handles all the processing activities related to payment provider message communications, transaction resolution monitors, splitting and bundling refund transactions, and synchronous and asynchronous message handling.

Upon completing the particular transaction called for by the merchant 103, the UMP 110 returns a processing message summarizing the results of the transaction. Additionally, assuming the transaction succeeds, the UMP 110 may return a payment receipt from the alternative payment provider 114 as part of the processing message. The processing message sent to the merchant 103 is formatted according to the unified message format used by the transaction messages.

As should be apparent to those skilled in the art, the foregoing discussion dealt primarily with a transaction message to transfer funds to the merchant, i.e., authorize/capture. Usually, this will be the end of the transaction. However, notwithstanding the above reference to completing the transaction, the transaction may not actually be completed. Rather, the transaction lifecycle may proceed to refunding the client. In such a case, the merchant 103 need only provide the UMP 110 with a transaction message containing the order identifier previously generated for the transaction and an operation type of refund.

Apart from processing transactions, the UMP 110 is also operative to facilitate back office accounting and daily reconciliation files. In such a case, the UMP provider is suitably partnered with one or more acquirers and processors, where that the UMP 110 provides transaction information to the one or more acquirers or processors. As shown in FIG. 2, the UMP 110 is partnered with a bank card processor 108. The processor provides the merchant 103 with all the alternative payment information in the same format used by other payment information. That is to say, transaction information from alternative payment options will be formatted in the same way as transaction information from other payment options, e.g., a bank card. This advantageously allows the merchant's existing back office reconciliation system 112 to recognize and perform the appropriate accounting processes without modification.

For merchant's that are using a processor that is incompatible with the UMP 110, the UMP 110 allows the merchant 103 to directly access daily summary reports for all supported alternative payment options. In such a case, customizations to the UMP back office format can be created to follow the format used by the merchant's other processors/acquirers. For example, the UMP back office format can be customized to match the back office format used by the merchant's bank card processor 108.

The UMP 110 may also advantageously provide merchants and the UMP provider with statistical information. Among other information, it is contemplated that the UMP 110 will track and report the number of users selecting alternative payment options, and whether the users complete or abandon the payment. Additionally, the UMP 110 may also track the time to complete a transaction and the average transaction amount. However, the foregoing examples are far from exhaustive, and it should be apparent to those skilled in the art that the UMP 110 may easily be modified to collect and report other statistical information.

Figure 3:
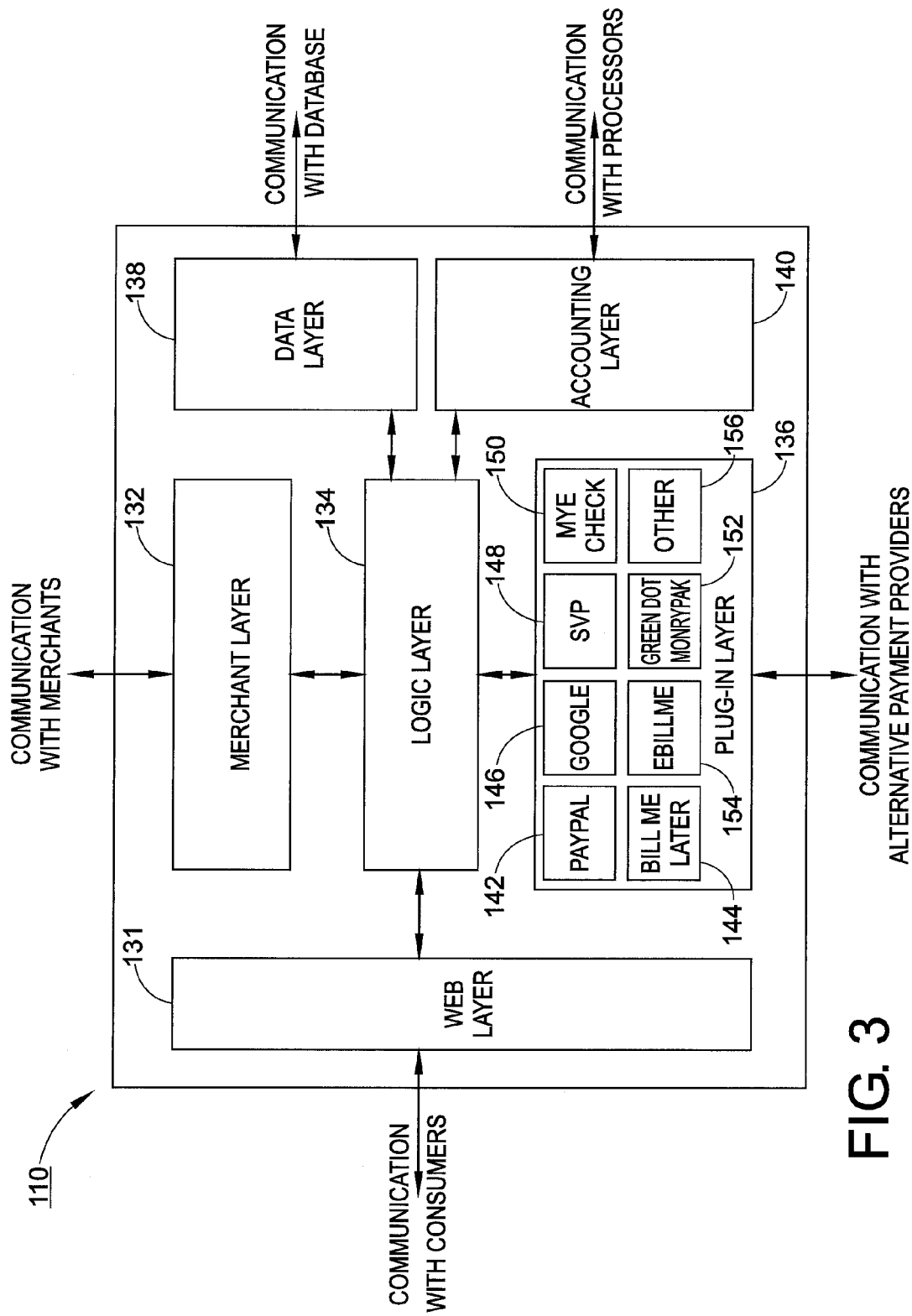
FIG. 3 is a diagrammatic illustration showing an exemplary universal merchant platform in accordance with aspects of the present invention.

With reference to FIG. 3, a diagrammatic illustration of an exemplary universal merchant platform 110 in accordance with aspects of the present invention is shown. The UMP 110 has been abstracted into 6 main components: a web layer 131, a merchant layer 132, a logic layer 134, a plug-in layer 136, a data layer 138 and an accounting layer 140. The web layer 131 collects additional payment information from the consumer 102. The merchant layer 132 communicates with the merchant 103. The logic layer 134 performs all the logic independent of which alternative payment provider is being used for the transaction. The plug-in layer contains all the logic specific to the alternative payment provider being used. The data layer 138 stores transaction information during the course of the transaction. The accounting layer 140 provides accounting information to the merchant 103 and/or processors, such as bank card processor 108. However, the foregoing layers are merely generalizations as to the specific roles of each layer, and each layer will be discussed in detail below. Moreover, it should be appreciated that individual layers making up the UMP 110 are only abstractions meant to help explain the UMP 110.

With respect to the plug-in layer 136, the plug-in layer 136 includes a plurality of plug-in components. As shown in FIG. 3, the plug-in layer 136 includes at least the following plug-in components: PayPal 142, Google 146, SVP 148, MyeCheck 150, Bill Me Later 144, eBillMe 154, Green Dot MoneyPak 152, and other plug-in components 156. Each plug-in component is operative to implement an alternative payment implementation of an alternative payment provider 114. That is to say, the plug-in component handles the message formats, communication protocols and response codes required by an alternative payment provider. Additionally, the plug-in component handles any synchronous and/or asynchronous communications received from an alternative payment provider 114. For example, the Google plug-in component 146 handles all asynchronous and synchronous messages received from Google 118 during the course of a transaction. Thus, the plug-in layer 136 contains all the logic specific to alternative payment providers 114.

As should be appreciated, the plug-in layer 136 allows the UMP 110 to disable a plug-in component if the corresponding alternative payment provider becomes unavailable. Moreover, the plug-in layer 136 allows the UMP 110 to be more readily maintained and expanded without disrupting service to the other alternative payment plug-in components. For example, when an alternative payment implementation is updated, all that needs to be modified is the plug-in component associated with the alternative payment implementation that has changed. Additionally, expanding support for additional alternative payment options is as simple is creating and/or installing a new plug-in component.

The web layer 131 serves to facilitate the collection of additional payment information. Namely, when the consumer 102 is redirected to the UMP 110, the web layer 131 provides the consumer 102 with a web interface to enter additional payment information. As described above, this additional payment information is specific to the alternative payment option being used for the transaction. Accordingly, the web layer 131 communicates with the plug-in component associated with the transaction to obtain the data fields which are specific to the alternative payment implementation associated with the transaction. The web layer 131 preferably creates the web interface dynamically from the obtained data fields. This advantageously allows additional plug-in components to be installed or existing plug-in components to be modified without having to modify the web layer 131.

With respect to the merchant layer 132, this is the layer that communicates with the merchants 103. Any number of interfaces may be provided for communications between the merchants 103 and the UMP 110, including, but not limited to, an HTTPS server, a direct connector, and an easy connector. The HTTPS server receives and/or sends HTTP messages, and communicates them to and/or from the logic layer 134. This connecter is used by a thin-client to communicate with the UMP 110. The direct connector provides a Java interface that can be used by a merchant 103 integrating with the UMP 110 using the direct connection approach. This connector exposes the appropriate Java interfaces than can be used by the merchant 103 during integration. Messages received/sent using this connector are also communicated to/from the logic layer 134. The easy connector provides a web server that is used to communicate with the logic layer 134.

Implementing multiple connector types provides multiple ways for merchants 103 to integrate and participate within the various alternative payment providers 114. By providing multiple integration approaches, a wide variety of merchants 103 can be supported depending upon the merchant's 103 technical expertise, resource availability and transaction processing volume. That is to say, in addition to the thin-client approach, a direct connection and easy connection approach are also optional available to merchants 103.

The direct connection approach is provided for merchants 103 which insist on or otherwise want to host and manage the product, e.g., such merchants 103 may be high transaction volume merchants 103 and/or merchants 103 who have the technical resources to host and manage the product. The merchant 103 can use direct java calls to interface with the UMP 110 and communicate the appropriate messages. The direct connect interface is also available via a local socket server provided as part of the UMP 110. Merchants utilizing a software platform other than Java can use the local socket server. Under the direct connection approach the merchants provide their own hardware and/or software.

On the opposite end of the spectrum, the easy connection approach is provided as a software-less integration approach for merchants that do not wish to install the thin-client. Using the easy connect approach, the merchant 103 redirects the consumer 102 to the UMP 110 easy connect web server. The web server acts on behalf of the merchant's website 104 and communicates with the UMP 110 to provide the appropriate processing for the appropriate alternative payment implementation. Under this approach, the merchant 103 redirects the consumer 102 using HTTPS posts and receives the responses at a specified response URL. HTTP redirections are performed via the consumer's browser. Using the easy connection approach the merchant 103 may place an appropriate script after the transaction has been completed. The merchant receives the results at a URL specified within a response URL field designated in the script.

Somewhere between the direct approach and the easy connection approach, the thin-client approach is used for communicating transaction information between the merchant's website 104 and the UMP 110. The thin-client is not aware of the specific processing logic or protocols prescribed for by each alternative payment implementation. Suitably, the thin-client is a small software component installed on the merchant's 103 server, e.g., approximately 50 kilobytes in size. Merchants 103 use the thin client to securely communicate with the UMP 110. The thin client supports the following features: secure communication to the UMP 110, formatting data to the unified message format, and allowing merchants 103 to access response data.

The data layer 138 operates to store transaction information for use during the transaction lifecycle and beyond. As described above, the UMP 110 must collect transaction information over numerous steps before it can complete the transaction. Thus, it will generally be necessary to maintain transaction information for later use during the transaction lifecycle. The data layer 138 may store the data in any number of ways, as known in the art. Among other ways to store the information, the transaction information can be stored locally in a data structure in the UMP's 110 internal memory, files, or traditional databases, such as MySQL. Alternatively, the data layer may store the transaction information externally, as is shown in FIG. 2 with database 130. In such a case, the data layer 138 provides a standardized interface to the external database 130.

The accounting layer 140 serves to address functions related to the merchant's back office accounting system 112. Namely, the accounting layer 140 serves to provide the processors/acquirers associated with the UMP 110, such as bank card processor 108, with transaction information for all the transactions performed. The accounting layer 140 also serves to generate daily summary reports for merchants 103 that don't have a suitable processor, i.e., a processor incompatible with the UMP 110.

The logic layer 134 is the heart of the UMP 110 and serves primarily to connect all the aforementioned layers. The logic layer 134 distributes transaction messages from the merchants 103 to the plug-in component associated with the alternative payment option selected. The plug-in component then proceeds to perform the operation specified in the transaction message. In doing so, the plug-in component requests any transaction information necessary to complete the transaction from the logic layer 134, whereby the logic layer 134 fetches the requested information from the data layer 138 and returns it to the plug-in component.

The logic layer 134 also stores information obtained from the web layer 132 to the data layer 138 for later use. That is to say, when the consumer 102 is redirected to the web layer 131 to enter additional payment information specific to the alternative payment option associated with consumer 102, the logic layer 134 collects the information from the web layer 131 and stores it in the data layer 138. Additionally, the logic layer 134 is operative to retrieve the order identifier and return redirection URL from the data layer 138. These two items are needed to return the consumer 102 to the merchant website 104 after additional information has been collected on the web layer 131. Along these lines, the logic layer is also operative to store transaction information received from merchants 103. When the merchant layer 132 receives such information, the logic layer 134 stores it to the data layer 138 for later use.

Yet another important function of the logic layer 134 is to route messages to/from the accounting layer 140 from/to the data layer 138 and/or the merchant layer 132. For example, the logic layer 134 routes transaction information from the data layer 138 to the accounting layer 140. The accounting layer 140 needs the transaction information so it can provide transaction information to any processors/acquirers associated with the UMP 110. Additionally, the logic layer 134 routes requests for daily summary reports from merchants 103, received via the merchant layer 132, to the accounting layer 140. Thereafter, the logic layer 134 routes the corresponding response from the accounting layer 140 back to the merchant layer 132, where it is returned to the requesting merchant 103. As mentioned above, the daily summary reports may be requested directly from the UMP 110. This is generally used in situations where the merchant's processor is incompatible with the UMP 110.

Beyond bridging communications between the various layers of the UMP 110, the logic layer 134 also generates order identifiers, and in some cases tokens. When the order identifier is generated, the logic layer 134 stores it in the data layer 138 and returns it to the merchant 103 by way of the merchant layer 132. With respect to tokens, the logic layer 134 generates the tokens when the alternative payment option selected does not require the user to be directly authenticated with the alternative payment provider 114. Otherwise, the logic layer 134 requests the plug-in component associated with the alternative payment option initiate the transaction with the alternative payment provider 114 and return a token.

The logic layer 134 also returns the appropriate redirection URL: a URL to the UMP 110 or a URL to the alternative payment provider 114. If the alternative payment option requires the user to be authenticated on its site, the redirection URL is retrieved from the plug-in component associated with the transaction. Otherwise, the redirection URL points to the UMP 110.

As should be apparent from the foregoing discussion, the logic layer 134 acts primarily as a bridge to connect all the other layers. Furthermore, it implements most of the logic that is independent of the alternative payment provider being used for a transaction. However, it is important to note that the layers are only abstractions meant to help explain the inner workings of the UMP 110. Accordingly, any of the foregoing functions described in the layers may alternatively be implemented in other layers. Moreover, the foregoing discussion merely describes one embodiment for implementing the inventive features of the present invention. It is contemplated that other embodiments will be apparent to those skilled in the art.

Figure 4:
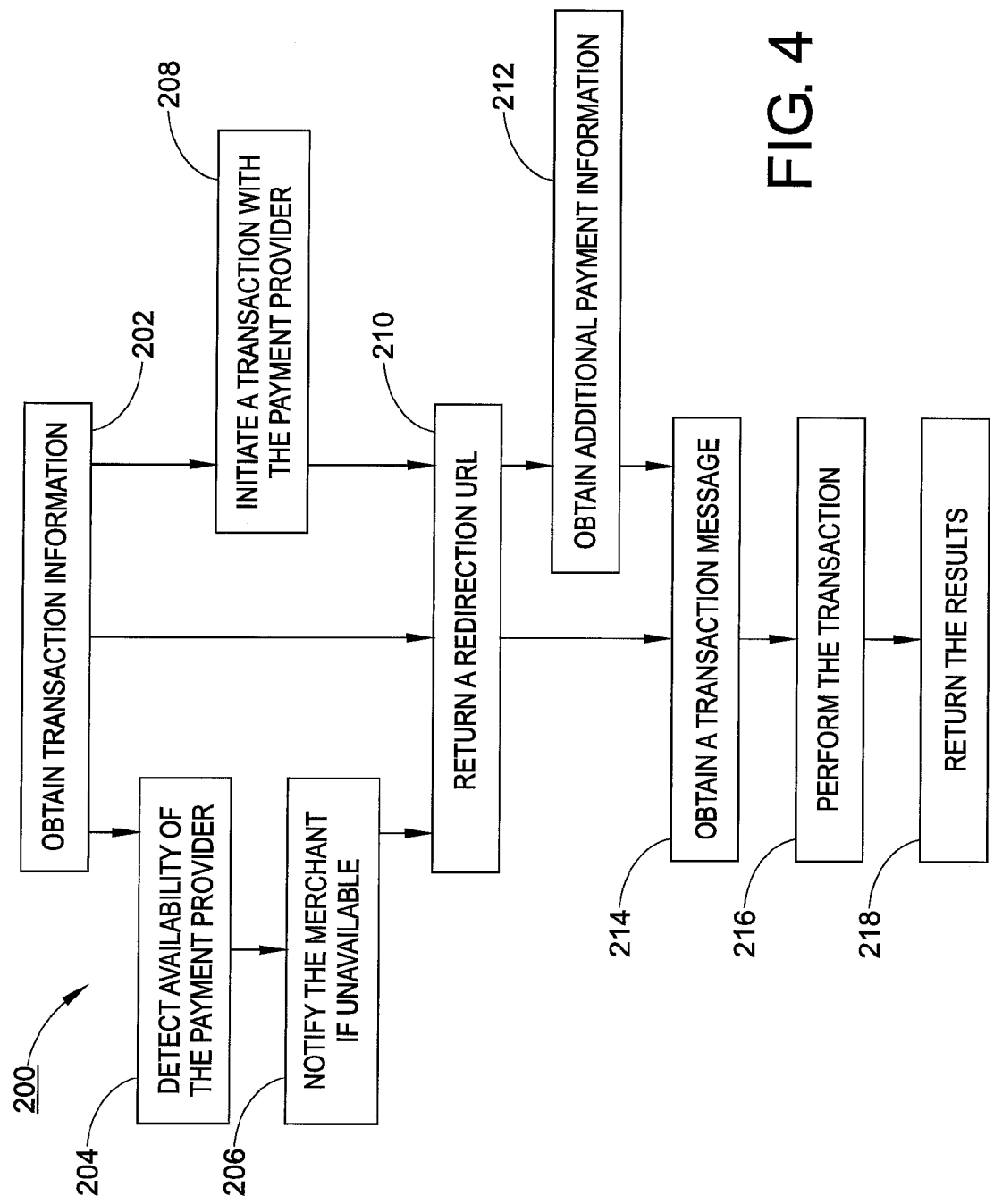
FIG. 4 is a flowchart illustrating an exemplary method for processing an e-commerce transaction between a merchant and a buyer over a communications network, wherein the transaction is conducted using one of a plurality of alternative payment options.

With reference to FIG. 4, a flowchart illustrating an exemplary method 200 for processing an e-commerce transaction between a merchant 103 and a consumer 102 over a communications network, from the perspective of the UMP 110, is provided. The transaction is conducted using one of a plurality of alternative payment options. The method includes the core steps of obtaining transaction information (Step 202), returning a redirection URL (Step 210), obtaining a transaction message (Step 214), performing the transaction (Step 216) and returning the results from performing the transaction (Step 218). The method optionally includes detecting the availability of an alternative payment provider (Step 204) and notifying the merchant if the alternative payment provider is unavailable (Step 206). Additionally, the method optionally includes initiating a transaction with the alternative payment provider (Step 208) or obtaining additional payment information (Step 212).

The first step is to obtain transaction information from the merchant 103 (Step 202). This transaction information includes, but is not limited to, payment information, order information and shipping information. The payment information includes the alternative payment option being used for the transaction. Additionally, as described above, this information is stored for use later during the life cycle of the transaction.

After obtaining the transaction information (Step 202), the UMP 110 optionally detects the availability of the alternative payment option requested (Step 204). That is to say, the UMP 110 checks whether the servers of the alternative payment provider associated with the selected alternative payment option are unavailable. If the alternative payment option requested is unavailable, the UMP 110 flags it is being unavailable for subsequent transactions. The UMP 110 further provides the merchant 103 with a notification of the failure (Step 206), so the merchant 103 may fail gracefully and provide the consumer 102 with the option of selecting another method of payment.

Subsequent to obtaining the transaction information from the merchant 103 (Step 202), but after detecting the availability of the alternative payment provider (Step 206), the UMP 110 may need to initiate a transaction with the alternative payment provider 114 associated with the selected alternative payment option (Step 208). Such action is necessary when alternative payment implementation associated with the selected alternative payment option requires the consumer 102 to authenticate directly with the alternative payment provider 114. Accordingly, in some situations the UMP 110 will initiate communicates with the alternative payment provider 114 so as to retrieve a token. As described above, this process also entails setting a return redirection URL and providing the alternative payment provider 114 with transaction information, such as order information.

Subsequent to the preceding steps, the UMP 110 returns a redirection URL and a token to the merchant 103 (Step 210). As mentioned above, the token uniquely identifies the transaction to the UMP 110 or the alternative payment provider 114. The UMP 110 will further provide the merchant 103 with an order identifier for the merchant's 103 order management system 106. Merchants 103 use the order identifier in subsequent steps to complete the transaction.

After returning the redirection URL (Step 210), the UMP 110 may optionally obtain additional payment information from the consumer 102 (Step 212). This situation applies when the alternative payment provider 114 associated with the selected alternative payment option calls for additional payment information, and does not require the consumer 102 to authenticate directly with the alternative payment provider 114. In this step, the consumer 102 is provided with a web page where they are prompted to enter payment information specific to the alternative payment option selected. After the consumer 102 enters this information, the UMP 110 redirects the user to the merchant's website 104.

Regardless of how the consumer is returned to the merchant's site 104, once the consumer 102 is returned the UMP 110 obtains a transaction message from the merchant 103 (Step 214). The transaction message contains at least the order identifier of the transaction, an operation type and the amount to be transferred. The operation type is one of authorize/capture and refund. Additionally, the transaction message is formatted according to a unified message format. The unified message format is part of a unified payment implementation. The unified payment implementation allows the merchant 103 to implement a single payment implementation and access all the alternative payment implementations supported by UMP 110.

After obtaining the transaction message (Step 214), the UMP 110 proceeds to perform the operation specified in the transaction message (Step 216). In the case of an operation type of authorize/capture, the UMP 110 transfers funds from the consumer 102 to the merchant 103. In the case of a transaction message to refund funds, the UMP 110 transfers funds from the merchant 103 to the consumer 102. The operation is carried out using the alternative payment implementation associated with the transaction. That is to say, the UMP 110 performs the operation using the specific message formats, communication protocols and response codes called for by the alternative payment provider.

Once the UMP 110 has performed the transaction to completion (Step 216), the UMP 110 returns a processing message containing the results to the merchant (Step 218) 103. The results are formatted according to the unified message format used by the transaction message. The transaction message may further contain a transaction receipt from the alternative payment provider 114.

Figure 5:
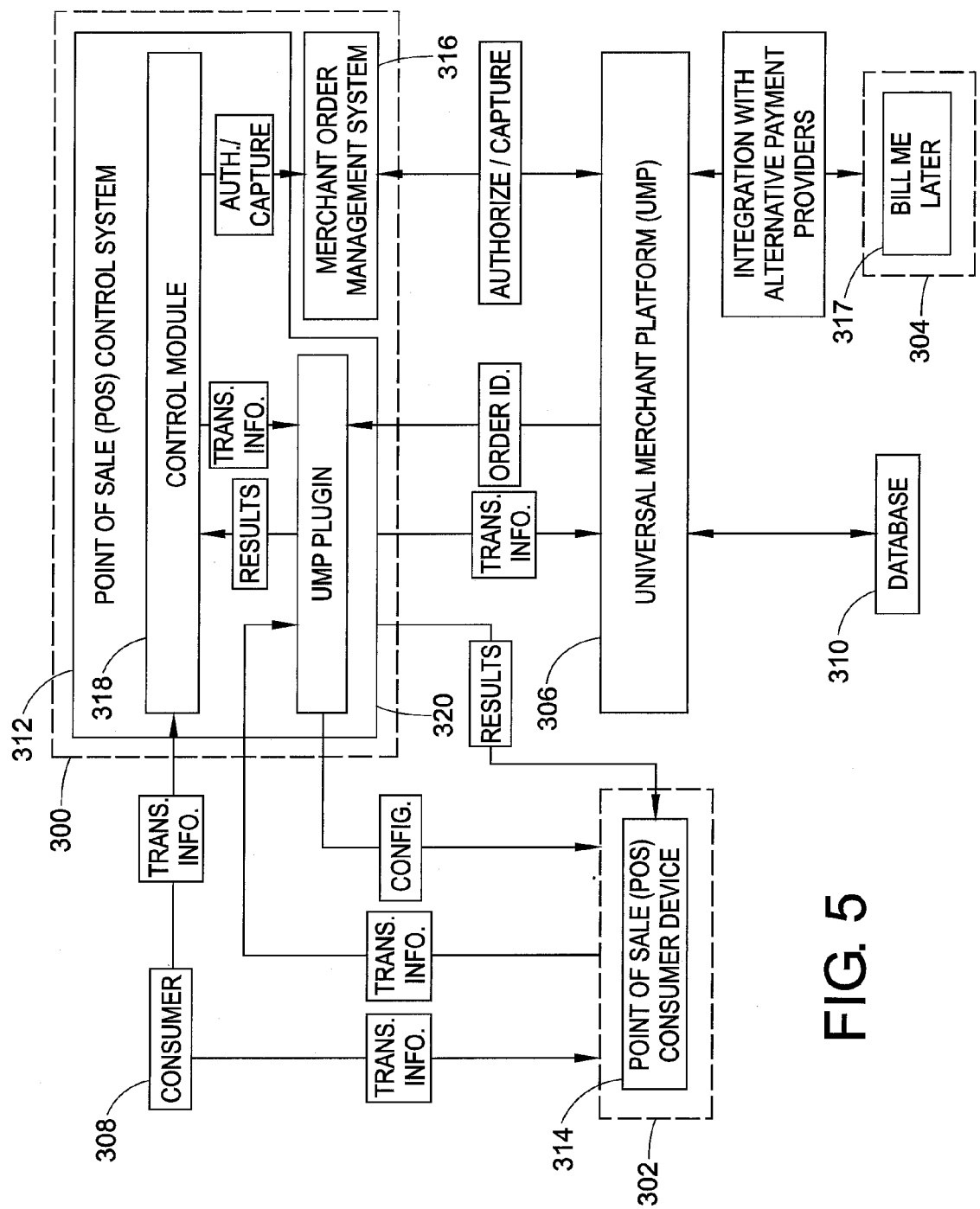
FIG. 5 is a diagrammatic illustration showing an exemplary point of sale system that a merchant may employ to support one or more alternative payment options via a universal merchant platform and the flow of messages for authorizing and/or capturing funds for a transaction.
Figure 6:
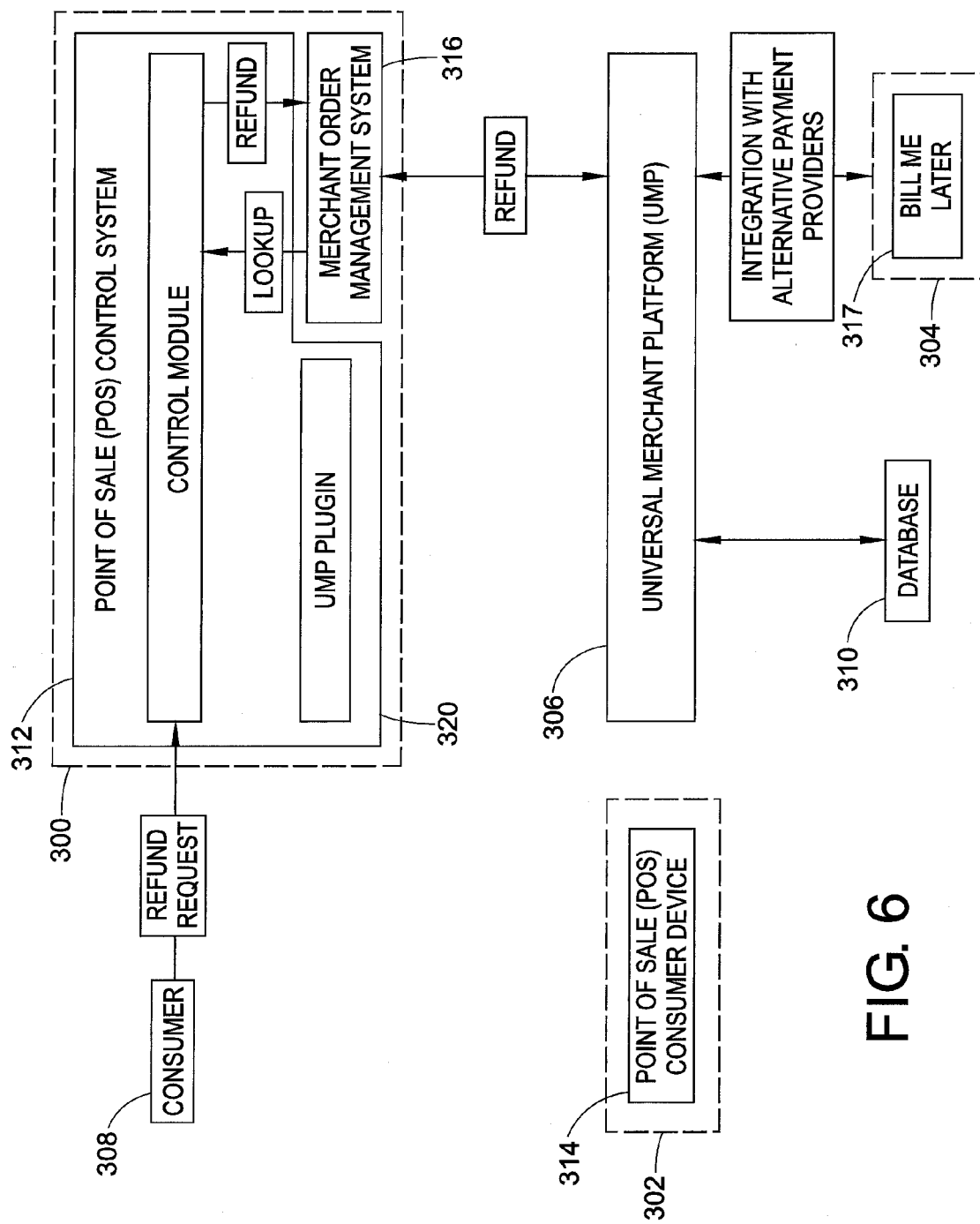
FIG. 6 is a diagrammatic illustration showing an exemplary point of sale system that a merchant may employ to support one or more alternative payment options via a universal merchant platform and the flow of messages for refunding funds for a transaction.

With reference to FIGS. 5 and 6, a diagrammatic illustration of an exemplary point of sale (POS) system 300 that a merchant 302 may employ to support one or more alternative payment providers 304 via a UMP 306 is shown. The system 300 includes, but is not limited to, a consumer 308, the merchant 302, the UMP 306, a database 310, and the alternative payment providers 304.

The consumer 308 is generally a person or legal entity, such as a corporation, looking to buy one or more goods and/or or services from the merchant 302, and the merchant is generally a person or legal entity looking to sell the goods and/or services to the consumer 308. Other transactional exchanges of information are contemplated. In completing a transaction, the consumer 308 and the merchant 302 directly interact with one another (e.g., in person) at a POS, where the consumer 308 pays using an alternative payment option supported by the alternative payment providers 304. The POS is typically at a place of business of the merchant 302, such as a storefront, but can be elsewhere.

The merchant 302 includes, but is not limited to, a POS system 312, 314 and a merchant order management system 316. The POS system 312, 314 is located at the POS and the interface through which the consumer 308 and, in some instances, a representative of the merchant 302, such as a store clerk, interact with the merchant order management system 316 and the UMP 306. The merchant order management system 316 processes orders for the merchant 302 that are initiated through the POS system 312, 314.

The POS system 312, 314 includes a POS control system 312, such as a POS workstation, and a POS consumer device 314, such as a VERIFONE MX860. Although shown separately, the POS control system 312 and the POS consumer device 314 can be one and the same. The POS control system 312 collects transaction information necessary to complete a transaction between the consumer 308 and the merchant 302 from the consumer 308. Further, the POS control system 312 coordinates completion of the transaction using the collected transaction information.

The UMP 306 and the database 310 are as described in connection with the UMP 110 of FIG. 2 and the database 130 of FIG. 2, respectively, unless noted otherwise. The UMP 306 provides a bridge between a uniform alternative payment implementation and the individual alternative payment implementations called for by the alternative payment providers supported by the UMP 306. The database 310 provides the UMP 306 with storage for transaction information and may be external or internal to the UMP 306. The database 310 may be a MySQL, MSSQL, Oracle, Microsoft Access, or other database.

The alternative payment providers 304 provide the alternative payment options accepted by the merchant 302. Typically, the alternative payment providers 304 do not require the consumer 308 to directly authenticate as part of the alternative payment implementations of the alternative payment options. Hence, the consumer 308 typically only ever needs to interact with the merchant 302. For example, Bill Me Later 317, which may be one of the alternative payment providers 304, does not require direct authentication.

With specific reference to FIG. 5, the general flow of messages between the constituent components of the POS system 300 for authorizing/capturing funds for a transaction is shown. Tracking the flow for the transaction within the system 300, the flow begins with the consumer 308. The consumer 308 typically determines goods and/or services to purchase from the merchant 302. The consumer 308 can do so by browsing a website of the merchant 302 and/or visiting a storefront of the merchant 302. Having determined the goods and/or services to purchase from the merchant 302, the consumer 308 and the merchant 302 meet at a POS. For example, the consumer 308 browses a retail store of the merchant 302 to identify goods they wish to buy from the merchant 302 and takes the identified goods to a checkout register of the merchant 302.

At the POS, the consumer 308 provides transaction information to a control module 318 of the POS control system 312. The transaction information includes order information identifying the goods and/or services and a selection of an alternative payment option, such as Bill Me Later, of the alternative payment providers 304 for payment of the goods and/or services. Further, the transaction information can include customer information identifying the consumer 308, such as the name and address of the consumer 308. The control module 318 is typically a standard POS workstation software known to those skilled in the art.

To receive the transaction information, the control module 318 includes a user interface displayed on a display device of the POS control system 312. The transaction information is entered into the user interface using a user input device of the POS control system 312. Typically, the consumer 308 indirectly enters the transaction information into the user interface via a representative of the merchant 302, such as a store clerk. For example, the representative queries the consumer 308 for the transaction information and enters the responses provided by the consumer 308 into the user interface. Notwithstanding that the consumer 308 typically enters the transaction information indirectly, it is also contemplated that the consumer 308 can directly enter the transaction information.

The control module 318 provides the transaction information to a UMP plugin 320 of the POS control system 312. In some embodiments, the UMP plugin 320 is a java applet run within a browser, such as FIREFOX, of the POS control system 312. In such embodiments, the transaction information is provided to the java applet by invoking a URL pointing to the java applet and using, for example, form posts or query strings to transfer the transaction information to the java applet. In some embodiments, a third party, different than the merchant 302 and the consumer 308, maintains the UMP plugin 320 and/or the UMP 306, and the URL points to the third party.

The UMP plugin 320, based on the transaction information, generates a configuration for the POS consumer device 314 and provides the generated configuration to the POS consumer device 314. The configuration defines a user interface to collect additional transaction information, including payment information required by the selected alternative payment option, from the consumer 308. The user interface can further be defined to receive confirmation of the transaction information, such as the customer information, from the consumer 308. Further, the configuration is specific to the selected alternative payment option. Hence, the UMP plugin 320 includes information, or access to information, regarding the payment information required for each of the alternative payment options supported by the merchant 302. In some embodiments, the defined user interface is a series of one or more forms to be completed by the consumer 308.

The POS consumer device 314 employs the configuration to generate the user interface and display the user interface on a display device of the POS consumer device 314. The consumer 308 enters the required payment information into the user interface and, in some instance, confirms the transaction information, using a user input device of the POS consumer device 314. Typically, the consumer 308 interacts with the POS consumer device 314 directly to enter the required payment information and/or confirm the transaction information. Hence, whereas the user interface of the control module 318 is typically presented to a representative of the merchant 302, the user interface of the POS consumer device 314 is typically presented to the consumer 308. Advantageously, this allows the consumer 308 to enter sensitive payment information, such as date of birth and/or social security number, without having to provide the information to the representative.

The transaction information entered in the user interface of the POS consumer device 314 is securely transferred to the UMP plugin 320. At this point, the UMP plugin 320 typically includes all transaction information needed to complete the transaction, including the selection of the alternative payment option, the customer information, the payment information, and the order information. The UMP plugin 320 provides the transaction information to the UMP 306. The transaction information is typically provided to the UMP 306 using a messaging format common to all the alternative payment options. This allows the merchant 302 to use a single message format for any of the alternative payment options.

Once the UMP 306 receives the transaction information, the UMP 306 attempts to approve the transaction with the alternative payment provider of the selected alternative payment option and provides the UMP plugin 320 with the results. In that regard, the UMP 306 provides the transaction information to the alternative payment in an approval request. The approval request is provided to the alternative payment provider according to the specific implementation required by the alternative payment provider associated with the selected alternative payment option. The UMP 306 takes all the specific message formats and protocols called for by the alternative payment provider in to account.

In addition to attempting to approve the transaction, the UMP 306 generates a payment network routable order identifier that uniquely identifies the transaction. The merchant 302 uses the order identifier throughout the lifecycle of the transaction. The transaction lifecycle includes, but is not limited to, payment authorization, payment capture, and refund. The order identifier is preferably a Mod 10 compliant 16 digit number and may further be prefixed with specific digits to enable easier decision processing logic implementation within the merchant order management system 316. Additionally, the order identifier is preferably specific to the merchant 302, such that two different merchants may have the same order identifier.

In order to maintain a relationship between all the transaction information collected during the lifecycle of a transaction, the UMP 306 employs the database 310 to save the transaction information. As should be appreciated, the term "database" is being used loosely. A database may be a traditional database such as a database provided by MySQL, or it may simply be a data structure stored within the memory of the UMP 110. However, regardless of how the information is stored, the database 310 typically stores at least a merchant identifier (e.g., the merchant's name) and the order identifier for the transaction. The database 310 also stores information about the merchants registered to use the UMP 306.

The UMP plugin 320 provides the results of the approval request to the POS consumer device 314, which displays the results. Further, the UMP plugin 320 provides the results and the order identifier to the control module 318. Insofar as the results indicate approval, the control module 318 provides the merchant order management system 316 with the order identifier and instructions to authorize/capture funds. The transaction information can also be provided to the merchant order management system 316. In response to the instructions and information, the merchant order management system 316 creates a record of the transaction, including the order identifier and, where received, the transaction information, in an internal database of the merchant order management system 316. Further, the merchant order management system 316 instructs the UMP 306 to authorize/capture funds for payment of the goods and/or services of the transaction. In that regard, the merchant order management system 316 sends a transaction message to authorize/capture the funds for the transaction, which is identified with the order identifier. The transaction message is formatted with a messaging format common to all the alternative payment options, which allows the merchant 302 to use a single message format for any of the alternative payment options. The UMP 306 does any needed translation between the common message format and the message format called for by the alternative payment provider of the selected alternative payment option.

With specific reference to FIG. 6, the general flow of messages between the constituent components of the POS system 300 for refunding funds for the transaction is shown. Tracking the flow of the transaction within the system 300, the flow begins with the consumer 308. The consumer 308 and the merchant 302 meet at the POS, and the consumer 308 submits a refund request to the control module 318 of the merchant 302. Insofar as the refund request is for goods, the consumer 308 typically returns the goods to the merchant 302. The request includes sufficient information to lookup the order identifier of the transaction. For example, the request can identify customer information and order information of the transaction.

To receive the requisite information for refund request, the control module 318 employs the user interface of the control module 318. The information is entered into the user interface using the user input device of the POS control system 312. Typically, the consumer indirectly enters the transaction information into the user interface via a representative of the merchant 302, such as a store clerk. For example, the representative queries the consumer 308 for the transaction information and enters the responses provided by the consumer 308 into the user interface. Notwithstanding that the consumer 308 typically enters the transaction information indirectly, it is also contemplated that the consumer 308 can directly enter the transaction information.

The control module 318, using the information of the refund request, submits a lookup request to the merchant order management system 316 for the order identifier. The merchant order management system 316 queries the internal database to determine the order identifier and returns the order identifier to the control module 318, which, in turn, provides the merchant order management system 316 with the order identifier and instructions to complete the refunding of funds. This, in turn, prompts the merchant order management system 316 to instruct the UMP 306 to refund the consumer 308. In that regard, the merchant order management system 316 sends a transaction message to refund funds for the transaction, which is identified with the order identifier. The transaction message is formatted with a messaging format common to all the alternative payment options, which allows the merchant 302 to use a single message format for any of the alternative payment options. The UMP 306 does any needed translation between the common message format and the message format called for by the alternative payment provider of the selected alternative payment option.

Figure 7:
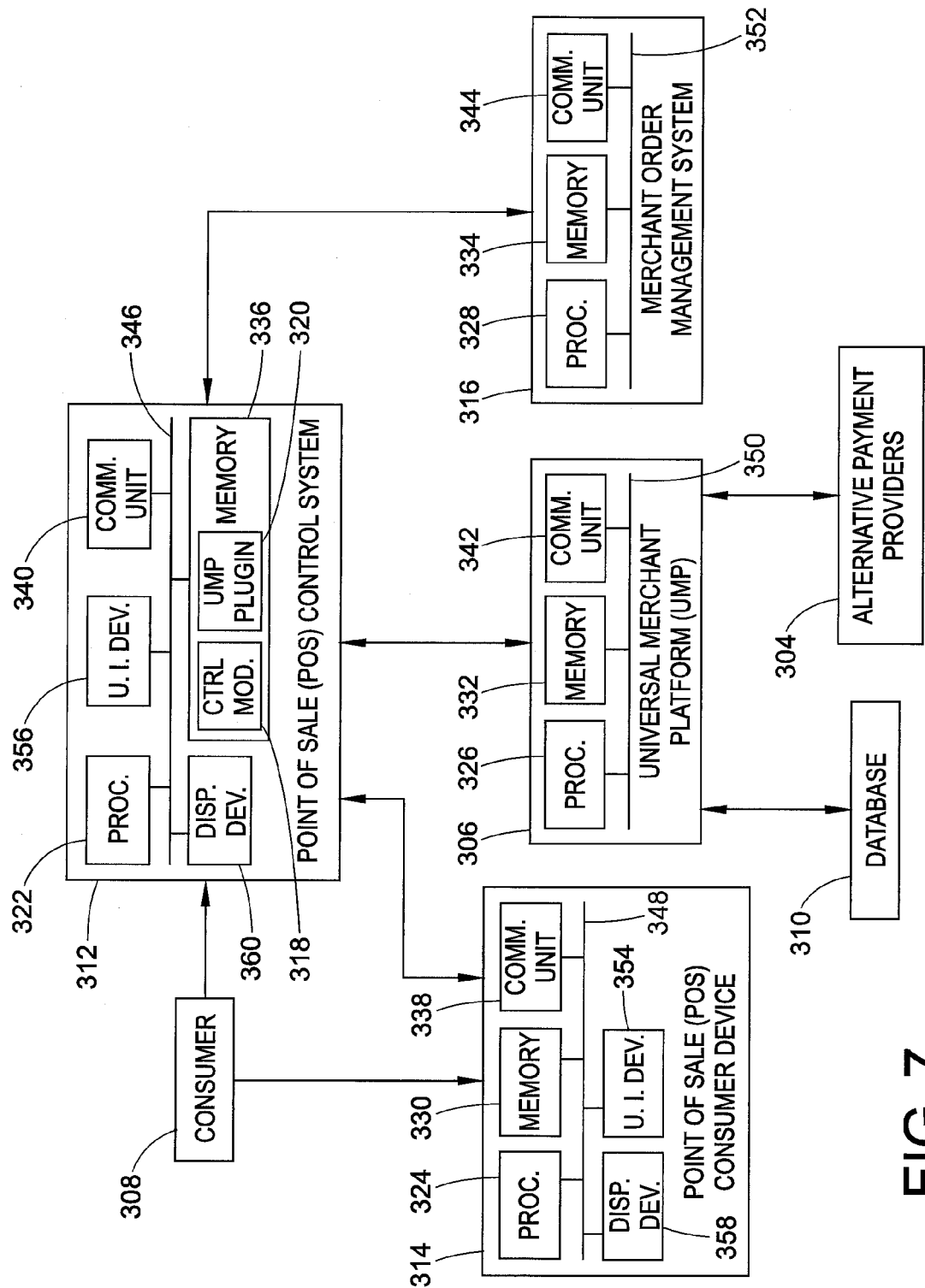
FIG. 7 is a diagrammatic illustration showing an exemplary point of sale system that a merchant may employ to support one or more alternative payment options via a universal merchant platform and the structural components of the point of sale system.

With reference to FIG. 7, a diagrammatic illustration of the structural components of the POS system 300 of FIGS. 5 and 6 is illustrated. Each of the POS control system 312, the POS consumer device 314, the UMP 306, and the merchant order management system 316 include at least one processor 322, 324, 326, 328, at least one memory 330, 332, 334, 336, a communication unit 338, 340, 342, 344, and at least one system bus 346, 348, 350, 352. The memory 336 of the POS control system 312 includes the control module 318 and the UMP plugin 320. Further, each of the POS control system 312 and the POS consumer device 314 include a user input device 354, 356 and a display device 358, 360.

The memories 330, 332, 334, 336 each store processor executable instructions for carrying out the functions associated with the corresponding one of the POS control system 312, the POS consumer device 314, the UMP 306, and the merchant order management system 316. The processors 322, 324, 326, 328 execute the processor executable instructions stored on the corresponding memories 330, 332, 334, 336. The communication units 338, 340, 342, 344 facilitate communication between the POS control system 312, the POS consumer device 314, the UMP 306, and the merchant order management system 316 over, for example, a communication network, such as the Internet, a local area network, a wide area network, etc. The user input devices 354, 356 each allow an associated user to provide data to the corresponding one of the POS control system 312 and the POS consumer device 314. The display devices 358, 360 each allow the display of a user interface for the corresponding one of the POS control system 312 and the POS consumer device 314. The system buses 346, 348, 350, 352 facilitate communication between the processors 322, 324, 326, 328, the memories 330, 332, 334, 336, the communication units 338, 340, 342, 344, the user input devices 354, 356 and the display devices 358, 360.

It is also to be appreciated that the UMP 110 and the merchant order management system 106 can include the same structural components as the UMP 306 and the merchant order management system 316, respectively. For example, the UMP 110 can include the processor 326, the memory 332, communication unit 342 and the system bus 350. As another example, the merchant order management system 106 can include the processor 328, the memory 334, the communication unit 344 and the system bus 352. Insofar as the UMP 110 and/or the merchant order management system 106 include the same structural components, the structural components carry out the respective functionality of the UMP 110 and the merchant order management system 106.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a controller includes at least one memory and at least one processor, the processor executing processor executable instructions on the memory; a user input device includes one or more of a mouse, a keyboard, a touch screen display, one or more buttons, one or more switches, one or more toggles, and the like; and a display device includes one or more of a LCD display, an LED display, a plasma display, a projection display, a touch screen display, and the like.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The invention claimed is:

1. An apparatus for processing a transaction between a merchant and a consumer at a point of sale (POS), said apparatus comprising:
   a POS control system comprising one or more processors configured to:
      receive POS transaction information from the consumer via a POS consumer device, the transaction information identifying at least an alternative payment option of an alternative payment provider to use for the transaction;
      send a request to a universal merchant platform (UMP) for approval of the transaction with the alternative payment provider of the identified alternative payment option, and provide the request for approval to the UMP according to a unified payment implementation;
      receive an order identifier from the UMP, the order identifier uniquely identifying the transaction;
      send a request the UMP to authorize and capture funds for the transaction using a payment implementation specific to the alternative payment provider of the identified alternative payment option, the request to authorize and capture the funds for the transaction identifying the transaction with the received order identifier and provided to the UMP according to the unified payment implementation; and
      operate a UMP plugin run on the POS control system, the UMP plugin being configured to:
         store payment information required for each alternative payment provider of a plurality of alternative payment providers; and
         using the stored payment information, define a configuration of the POS consumer device, the configuration defining a user interface to collect payment information required by the alternative payment provider of the identified alternative payment option; and
      wherein the one or more processors are further configured to send the configuration to the POS consumer device.

2. The apparatus according to claim 1, wherein the one or more processors are configured to receive the POS transaction information by:
  receiving identification of the alternative payment option from the consumer;
  configuring a user interface to collect transaction information required to carry out the transaction using the identified alternative payment option, the user interface configured specifically for the identified alternative payment option; and,
  receiving the required transaction information from the consumer from the user interface.

3. The apparatus according to claim 2, wherein the one or more processors are further configured to receive the identification of the alternative payment option from a second user interface, different than the user interface.

4. The apparatus according to claim 3, wherein the one or more processors are further configured to:
  receive order information identifying goods and/or services and/or customer information identifying the consumer from the second user interface, the transaction information including the order information and/or the customer information.

5. The apparatus according to claim 3, wherein the POS consumer device is configured to display the user interface to the consumer and the one or more processors of the POS control system are configured to display the second user interface to the merchant.

6. The apparatus according to claim 1, wherein the UMP plugin is a java applet.

7. The apparatus according to claim 1, further including:
  an order management system of the merchant configured to generate the request to authorize and capture the funds.

8. The apparatus according to claim 1, wherein the one or more processors of the POS control system are further configured to:
  after authorizing and capturing the funds, receive a request for a refund from the consumer; and
  in response to the request for the refund, request the UMP to refund funds for the transaction using the payment implementation specific to the alternative payment provider of the identified alternative payment option, the request identifying the transaction with the order identifier and provided to the UMP according to the unified payment implementation.

9. The system according to claim 1, wherein the payment implementation specific to the alternative payment provider of the identified alternative payment option defines message formats, response codes and communication protocols.

10. A method for processing a transaction between a merchant and a consumer at a point of sale (POS), said method comprising:
  receiving via a POS consumer device POS transaction information from the consumer, the transaction information identifying an alternative payment option of an alternative payment provider to use for the transaction;
  sending a request by a POS control system a universal merchant platform (UMP) to approve the transaction with the alternative payment provider of the identified alternative payment option, the UMP providing a unified payment implementation for transacting with a plurality of alternative payment providers, including the alternative payment provider, and the request for approval including the received transaction information, wherein the request for approval is provided to the UMP according to the unified payment implementation;
  in response to approval of the transaction, receiving by the POS control system an order identifier from the UMP, the order identifier uniquely identifying the transaction; and,
  requesting by the POS control system the UMP to authorize and capture funds for the transaction using a payment implementation specific to the alternative payment provider of the identified alternative payment option, the request to authorize and capture the funds identifying the transaction with the received order identifier and provided to the UMP according to the unified payment implementation.

11. The method according to claim 10, wherein receiving the POS transaction information includes:
  receiving identification of the alternative payment option from the consumer;
  configuring a user interface to collect transaction information required to carry out the transaction using the identified alternative payment option, the user interface configured specifically for the identified alternative payment option; and,
  receiving the required transaction information from the consumer using the user interface.

12. The method according to claim 11, wherein identification of the alternative payment option is received using a second user interface, different than the user interface.

13. The method according to claim 12, wherein the method further includes:
  receiving order information identifying goods and/or services and/or customer information identifying the consumer, using the second user interface, the transaction information including the order information and/or the customer information.

14. The method according to claim 12, wherein the user interface is displayed to the consumer using the POS consumer device and the second user interface is displayed to the merchant using the POS control system.

15. The method according to claim 10, further including:
  generating the request for approval using a UMP plugin, the UMP plugin being a java applet.

16. The method according to claim 10, further including:
  generating the request to authorize and capture the funds using an order management system of the merchant.

17. The method according to claim 10, further including:
  after authorizing and capturing the funds, receiving a request for a refund from the consumer; and
  in response to the request for the refund, requesting the UMP to refund funds for the transaction using the payment implementation specific to the alternative payment provider of the identified alternative payment option, the request identifying the transaction with the order identifier and provided to the UMP according to the unified payment implementation.

18. The method according to claim 10, wherein the payment implementation specific to the alternative payment provider of the identified alternative payment option defines message formats, response codes and communication protocols.

19. A non-transitory computer readable medium carrying software which controls at least one processor to perform the method according to claim 10.

20. A system for processing a transaction between a merchant and a consumer at a point of sale (POS), said system comprising:

a point of sale consumer device including a display device; and a POS control system including at least one processor, the at least one processor configured to:
receive first transaction information for the transaction from the consumer at the POS, wherein the first transaction information includes order information and/or customer information and identifies an alternative payment option of an alternative payment provider to use for the transaction, and wherein the first transaction information is received using a first user interface displayed to a representative of the merchant on a display device of the point of sale system;
configure a second user interface to collect second transaction information from the consumer at the POS, the second transaction information including transaction information required to carry out the transaction using the identified alternative payment option, the second user interface configured specifically for the identified alternative payment option;
receive the second transaction information from the consumer using the second user interface, wherein the second transaction information is displayed on the display device of the point of the sale consumer device;
request a universal merchant platform (UMP) to approve the transaction with the alternative payment provider of the identified alternative payment option, wherein the request for approval is provided to the UMP according to the unified payment implementation;
in response to approval of the transaction, receive an order identifier from the UMP, the order identifier uniquely identifying the transaction; and
request the UMP to authorize and capture funds for the transaction using a payment implementation specific to the alternative payment provider of the identified alternative payment option.

21. The apparatus according to claim 1, wherein:
the UMP plugin is configured to generate the request for approval.

22. The system according to claim 20, wherein:
the at least one processor is configured to operate a UMP plugin run on the POS control system; and
the UMP plugin is configured to:
define a configuration of the POS consumer device, the configuration defining a user interface to collect payment information required by the alternative payment provider of the identified alternative payment option.

23. The system according to claim 20, wherein:
the at least one processor is configured to operate a UMP plugin run on the POS control system;
the UMP plugin is configured to:
store payment information required for each alternative payment provider of a plurality of alternative payment providers; and
using the stored payment information, define a configuration of the POS consumer device, the configuration defining a user interface to collect payment information required by the alternative payment provider of the identified alternative payment option; and
the at least one processor is further configured to send the configuration to the POS consumer device.

24. The method according to claim 10, further comprising:
operating a UMP plugin run on the POS control system by:
storing payment information required for each alternative payment provider of a plurality of alternative payment providers; and
using the stored payment information, defining a configuration of the POS consumer device, the configuration defining a user interface to collect payment information required by the alternative payment provider of the identified alternative payment option; and
wherein the method further comprises sending the configuration to the POS consumer device.

* * * * *